United States Patent
Kim et al.

(10) Patent No.: US 11,463,363 B2
(45) Date of Patent: *Oct. 4, 2022

(54) METHOD AND APPARATUS FOR INTER-CELL LOAD BALANCE IN WIRELESS COMMUNICATION SYSTEM

(71) Applicant: Samsung Electronics Co., Ltd., Suwon-si (KR)

(72) Inventors: Eunyong Kim, Yongin-si (KR); Byungwook Jun, Seoul (KR); Jungmin Choi, Osan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 169 days.

This patent is subject to a terminal disclaimer.

(21) Appl. No.: 16/719,174

(22) Filed: Dec. 18, 2019

(65) Prior Publication Data

US 2020/0127925 A1 Apr. 23, 2020

Related U.S. Application Data

(63) Continuation of application No. 14/790,702, filed on Jul. 2, 2015, now Pat. No. 10,547,550.

(30) Foreign Application Priority Data

Jul. 2, 2014 (KR) .................. 10-2014-0082715

(51) Int. Cl.
*H04L 47/125* (2022.01)
*H04W 24/10* (2009.01)
(Continued)

(52) U.S. Cl.
CPC .......... *H04L 47/125* (2013.01); *H04W 24/10* (2013.01); *H04W 36/20* (2013.01); *H04W 36/22* (2013.01); *H04W 48/06* (2013.01)

(58) Field of Classification Search
None
See application file for complete search history.

(56) References Cited

U.S. PATENT DOCUMENTS 7,933,606 B2  4/2011  Frederiksen
8,452,299 B2  5/2013  Raghothaman
(Continued)

FOREIGN PATENT DOCUMENTS

CN  1448038 A  10/2003
CN  101861751 A  10/2010
(Continued)

OTHER PUBLICATIONS

New Postcom, Interference avoidance and coordination of small cells, 3GPP TSG-RAN WG1#72b R1-131118, Apr. 19, 2019.
(Continued)

*Primary Examiner* — Gregory B Sefcheck
(74) *Attorney, Agent, or Firm* — Jefferson IP Law, LLP

(57) ABSTRACT

A method and an apparatus for an inter-cell load balance in a wireless communication system are provided. The method of an inter-cell load balance of a first base station in a heterogeneous network wireless communication system including the first base station and a second base station includes configuring a first reserve area for the second base station, for the inter-cell load balance and controlling an inter-base station load balance according to the first reserve area.

20 Claims, 19 Drawing Sheets

(51) Int. Cl.
*H04W 36/20* (2009.01)
*H04W 48/06* (2009.01)
*H04W 36/22* (2009.01)

(56) References Cited

U.S. PATENT DOCUMENTS

| | | | |
|---|---|---|---|
| 8,644,224 B2 | 2/2014 | Iwamura | |
| 8,676,205 B2 | 3/2014 | Kwun et al. | |
| 8,743,723 B2 * | 6/2014 | Watfa | H04W 72/1289 370/252 |
| 8,830,856 B2 | 9/2014 | Hwang | |
| 8,837,301 B2 * | 9/2014 | Krishnamurthy | H04L 1/203 370/242 |
| 8,854,998 B2 * | 10/2014 | Johansson | H04W 24/08 370/252 |
| 8,917,700 B2 | 12/2014 | Ji et al. | |
| 8,964,644 B2 | 2/2015 | Balraj et al. | |
| 8,989,755 B2 | 3/2015 | Muruganathan et al. | |
| 9,026,167 B2 | 5/2015 | Li et al. | |
| 9,055,479 B2 | 6/2015 | Sun et al. | |
| 9,119,124 B2 | 8/2015 | Shi | |
| 9,137,713 B2 | 9/2015 | Radulescu et al. | |
| 9,173,140 B2 | 10/2015 | Agrawal et al. | |
| 9,173,209 B2 | 10/2015 | Prakash et al. | |
| 9,179,363 B2 | 11/2015 | Sionmina et al. | |
| 9,185,620 B2 | 11/2015 | Khoryaev et al. | |
| 9,191,851 B2 | 11/2015 | Teyeb et al. | |
| 9,203,574 B2 * | 12/2015 | Johansson | H04W 24/08 |
| 9,231,723 B2 | 1/2016 | Zhu et al. | |
| 9,253,679 B2 | 2/2016 | Lee et al. | |
| 9,253,699 B2 | 2/2016 | Choi et al. | |
| 9,258,080 B2 | 2/2016 | Feuersaenger et al. | |
| 9,277,470 B2 * | 3/2016 | Laroia | H04W 36/20 |
| 9,344,248 B2 * | 5/2016 | Krishnamurthy | H04L 27/0012 |
| 9,369,253 B2 | 6/2016 | Pourahmadi et al. | |
| 9,386,535 B2 | 7/2016 | Park et al. | |
| 9,398,480 B2 | 7/2016 | Siomina | |
| 9,398,496 B2 * | 7/2016 | Seo | H04W 36/20 |
| 9,420,476 B2 | 8/2016 | Koutsimanis et al. | |
| 9,425,946 B2 | 8/2016 | Pourahmadi et al. | |
| 9,433,004 B2 | 8/2016 | Siomina et al. | |
| 9,451,515 B2 | 9/2016 | Dimou et al. | |
| 9,456,407 B2 | 9/2016 | Yamine et al. | |
| 9,462,520 B2 | 10/2016 | Siomina et al. | |
| 9,473,996 B2 | 10/2016 | Nagata et al. | |
| 9,485,002 B2 | 11/2016 | Rusek et al. | |
| 9,491,648 B2 | 11/2016 | Choi et al. | |
| 9,503,216 B2 | 11/2016 | Siomina | |
| 9,544,105 B2 | 1/2017 | Siomina et al. | |
| 9,560,662 B2 | 1/2017 | Siomina et al. | |
| 9,565,574 B2 | 2/2017 | Konishi et al. | |
| 9,578,526 B2 | 2/2017 | Manssour et al. | |
| 9,578,558 B2 * | 2/2017 | Seo | H04L 1/00 |
| 9,621,308 B2 * | 4/2017 | Krishnamurthy | H04B 17/24 |
| 9,628,215 B2 | 4/2017 | Tan et al. | |
| 9,642,016 B2 | 5/2017 | Wang et al. | |
| 9,642,021 B2 | 5/2017 | Siomina et al. | |
| 9,763,278 B2 | 9/2017 | Seo | |
| 9,769,681 B2 | 9/2017 | Matsunaga et al. | |
| 9,794,811 B2 | 10/2017 | Lim et al. | |
| 9,794,849 B2 | 10/2017 | Liang | |
| 9,807,660 B2 | 10/2017 | Gunnarsson et al. | |
| 9,872,301 B2 | 1/2018 | Yang et al. | |
| 10,009,785 B2 * | 6/2018 | Kim | H04B 17/382 |
| 10,015,703 B2 * | 7/2018 | Futaki | H04W 24/02 |
| 10,136,369 B2 * | 11/2018 | Pang | H04W 36/0058 |
| 10,299,178 B2 | 5/2019 | Gunnarsson et al. | |
| 10,560,327 B2 * | 2/2020 | Chai | H04L 1/0026 |
| 10,791,476 B2 * | 9/2020 | Seo | H04W 72/085 |
| 10,999,774 B2 * | 5/2021 | Jun | H04W 16/04 |
| 2003/0171124 A1 | 9/2003 | Kataoka | |
| 2009/0137249 A1 | 5/2009 | Horn et al. | |
| 2012/0115541 A1 | 5/2012 | Suga | |
| 2012/0282864 A1 | 11/2012 | Dimou et al. | |
| 2013/0100837 A1 | 4/2013 | Iwamura | |
| 2013/0303167 A1 | 11/2013 | Zhu et al. | |
| 2013/0322235 A1 | 12/2013 | Khoryaev et al. | |
| 2014/0126403 A1 | 5/2014 | Siomina | |
| 2014/0162662 A1 | 6/2014 | Nagata et al. | |
| 2014/0220963 A1 | 8/2014 | Jung et al. | |
| 2014/0241250 A1 | 8/2014 | Jung et al. | |
| 2014/0293962 A1 * | 10/2014 | Wang | H04W 36/0088 370/331 |
| 2014/0295871 A1 | 10/2014 | Ahn et al. | |
| 2014/0301224 A1 | 10/2014 | Lin | |
| 2015/0296430 A1 | 10/2015 | Bakker et al. | |

FOREIGN PATENT DOCUMENTS

| | | | | |
|---|---|---|---|---|
| CN | 102905284 A | 1/2013 | | |
| CN | 103650592 A | 3/2014 | | |
| EP | 2 688 338 A1 | 1/2014 | | |
| JP | 2012-100220 A | 5/2012 | | |
| JP | 2013-225944 A | 10/2013 | | |
| JP | 2014-519235 A | 8/2014 | | |
| KR | 10-2015-0089893 A | 8/2015 | | |
| WO | 02/104056 A1 | 12/2002 | | |
| WO | 2012/093888 A2 | 7/2012 | | |
| WO | 2012/152633 A1 | 11/2012 | | |
| WO | 2013/051866 A1 | 4/2013 | | |
| WO | 2013/075742 A1 | 5/2013 | | |
| WO | 2013/135269 A1 | 9/2013 | | |
| WO | WO2014/027839 * | 2/2014 | | H04W 4/00 |
| WO | 2014/040623 A1 | 3/2014 | | |

OTHER PUBLICATIONS

Japanese Office Action dated May 11, 2019, issued in Japanese Application No. 2016-575966.
Fujitsu: Son functions vs. UE types in CRE scenarios, 3GPP Draft; R3-130056, 3rd Generation Partnership Project (3GPP), Mobile, Competence Centre ; 650, Route Des Lucioles ; F-06921 Sophia-Antipolis Cedex, Jan. 18, 2013, France, XP050670879.
Chinese Office Action dated Jul. 29, 2019, issued in Chinese Application No. 201580036016.0.

* cited by examiner

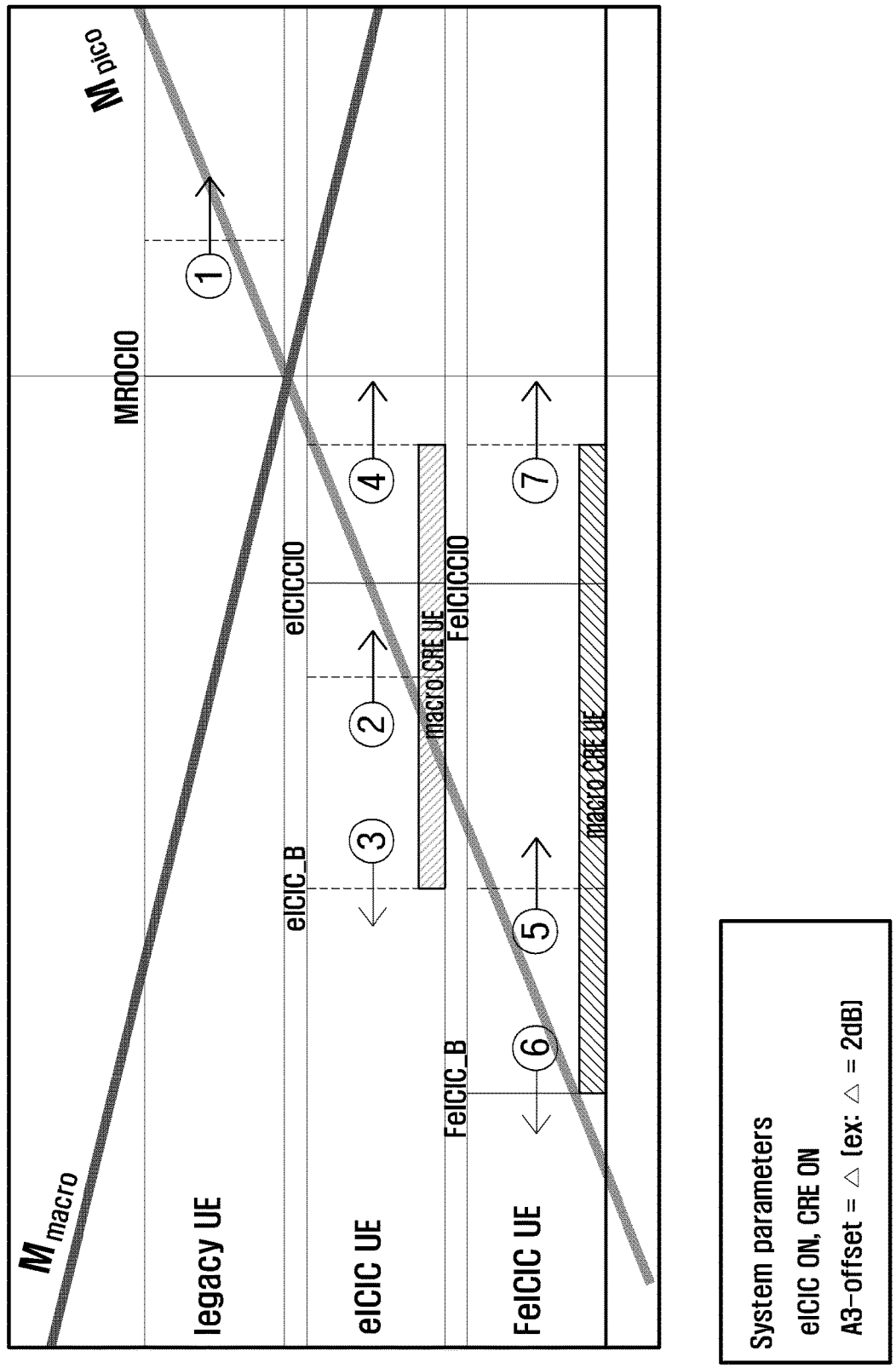

METHOD AND APPARATUS FOR INTER-CELL LOAD BALANCE IN WIRELESS COMMUNICATION SYSTEM

CROSS-REFERENCE TO RELATED APPLICATION(S)

This application is a continuation application of prior application Ser. No. 14/790,702, filed on Jul. 2, 2015, which has issued as U.S. Pat. No. 10,547,550 on Jan. 28, 2020; which was based on and claimed priority under 35 U.S.C § 119(a) of a Korean patent application number 10-2014-0082715, filed on Jul. 2, 2014, in the Korean Intellectual Property Office, the disclosure of which is incorporated by reference herein in its entirety.

TECHNICAL FIELD

The present disclosure relates to a wireless communication system. More particularly, the present disclosure relates to a method and an apparatus for an inter-cell load balance in a wireless communication system.

BACKGROUND

Typically, a wireless communication system has been developed to provide voice services while ensuring the mobility of users. However, the wireless communication system has gradually expanded to include a data service as well as a voice service and has been developed to provide a high speed data service. Though, since resources are lacking and users demand higher speed services in current mobile communication systems, an improved mobile communication system is needed.

To meet these demands, standardization of long term evolution (LTE) is being progressed by the 3rd generation partnership project (3GPP) as one of the next generation mobile communication systems. The LTE implements high speed packet based communication with a transmission rate of up to about several hundred Mbps. To this end, several methods are being discussed, including reducing the number of nodes located on a communication channel by simplifying a network architecture, making wireless protocols more closely access a wireless channel to the maximum capacity, and the like.

Specially, recently, a standardization for a time-domain inter-cell interference coordination has been progressed, and thus a base station should effectively manage a user equipment (UE).

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an apparatus for effectively managing a user equipment by a base station in a heterogeneous mobile communication system in which a macro cell and a small cell are mixed.

Another aspect of the present disclosure is to provide a method and an apparatus for improving a performance of a user equipment through an inter-base station load balance, in a heterogeneous network (HetNet) wherein a macro cell and a small cell share the same frequency.

In accordance with an aspect of the present disclosure, a method of an inter-cell load balance of a first base station in a heterogeneous network wireless communication system including the first base station and a second base station is provided. The method includes configuring a first reserve area for the second base station, for the inter-cell load balance and controlling an inter-base station load balance according to the first reserve area.

In accordance with another aspect of the present disclosure, a first base station for an inter-cell load balance in a heterogeneous network wireless communication system is provided. The first base station includes a transceiver configured to transmit and receive with a random node of the wireless communication system and a controller configured to control a first reserve area for the second base station, for the inter-cell load balance, and to control an inter-base station load balance according to the reserve area.

In accordance with another aspect of the present disclosure, a user equipment (UE) for performing a measurement report in a heterogeneous network wireless communication system including a first base station and a second base station is provided. The UE includes a transceiver configured to transmit and receive with a base station and a controller configured to receive a measurement report configuration message from the first base station, and to transmit the measurement report to the first base station according to the measurement report configuration message, wherein the measurement report configuration message is configured to enable the first base station to detect an entry into or an exit from a reserve area of the UE.

The first base station may determine whether the UE entry into or an exit from the first reserve area, according to the measurement report configuration message received from the UE.

In accordance with another aspect of the present disclosure, a method of reporting a measurement of a UE in a heterogeneous network wireless communication system including a first base station and a second base station is provided. The method includes receiving a measurement report configuration message from the first base station and transmitting the measurement report to the first base station according to the measurement report configuration message. The measurement report configuration message may be configured by a first base station such that the first base station detects entry into or an exit from a reserve area of the UE.

The first base station may determine whether the UE enters or exits the reserve area, according to the measurement report configuration message received from the UE.

According to the present disclosure, a method of an inter-cell load balance and a method of an inter-cell interference adjustment in a heterogeneous network mobile communication system in which a macro base station and a small base station are mixed are provided, and thus a wireless resource efficiency of a network can be increased. In addition, according to the present disclosure, a load balance state of a network can adaptively provide inter-cell load balancing and inter-cell interference adjustment.

Other aspects, advantages, and salient features of the disclosure will become apparent to those skilled in the art from the following detailed description, which, taken in conjunction with the annexed drawings, discloses various embodiments of the pre sent disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 6A and 6B are views illustrating a method of managing a UE by dividing the UE into a macro cell expansion area (CRE) UE and a macro non-CRE UE, by a macro CRE UE managing unit, according to an embodiment of the present disclosure;

Throughout the drawings, it should be noted that like reference numbers are used to depict the same or similar elements, features, and structures.

DETAILED DESCRIPTION

Figure 1:
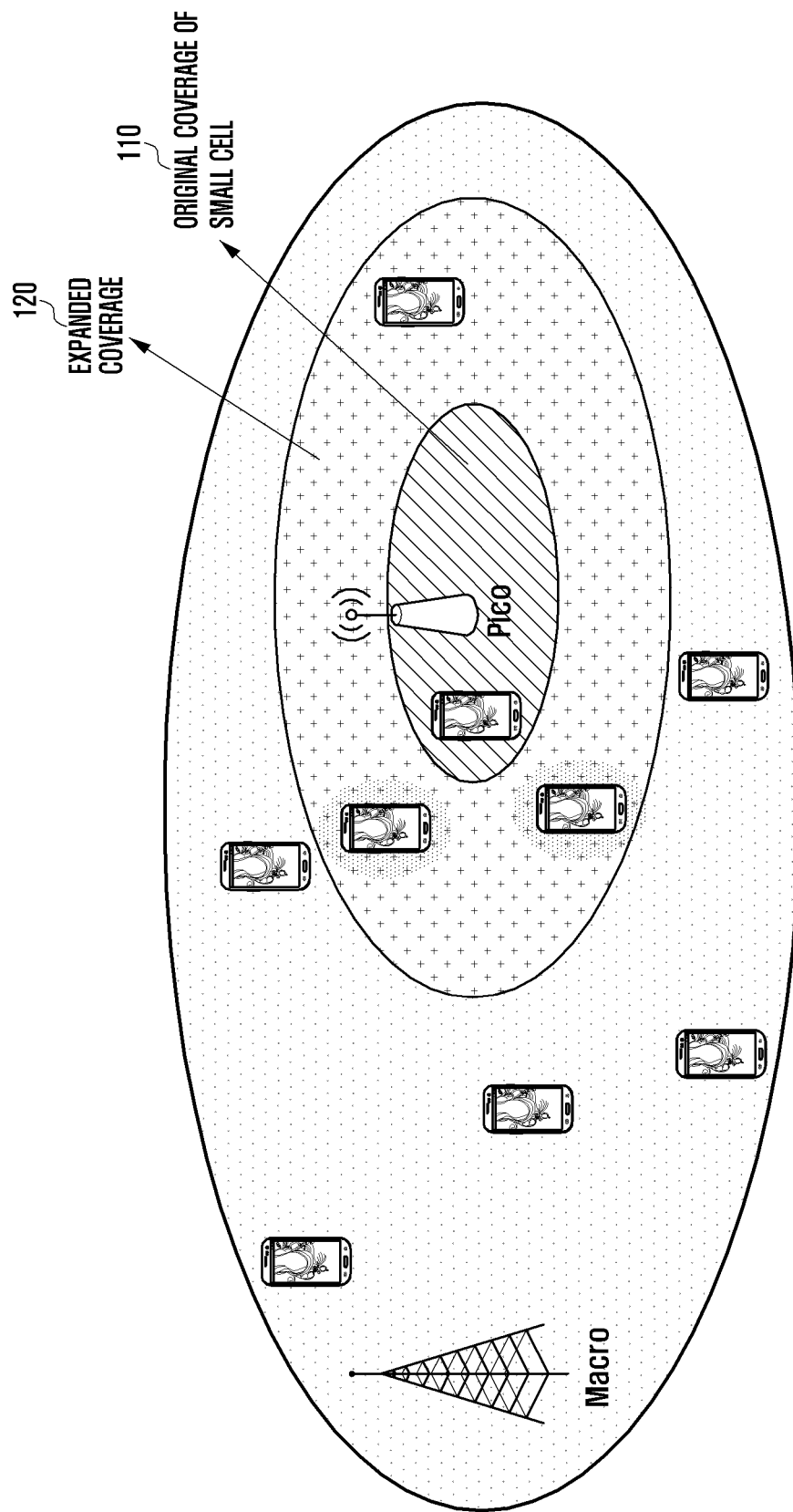
FIG. 1 is a view illustrating a coverage area of a small cell, when an enhanced inter-cell interference coordination (eI-CIC) technique is used according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing the various embodiments of the present disclosure, descriptions related to technical contents which are well-known in the art to which the present disclosure pertains, and are not directly associated with the present disclosure, will be omitted. Such an omission of unnecessary descriptions is intended to prevent obscuring the present disclosure.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, implement the flowchart block or blocks. These computer program instructions may also be stored in a computer usable or computer-readable memory that can direct a computer or other programmable data processing apparatus to function in a particular manner, such that the instructions stored in the computer usable or computer-readable memory that implement the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Each block of the flowchart illustrations may represent a module, segment, or portion of code, which includes one or more executable instructions for implementing the specified function. It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" or "module" refers to a software element or a hardware element, such as a field programmable gate array (FPGA) or an application specific integrated circuit (ASIC), which performs a predetermined function. However, the "unit" or "module" does not always have a meaning limited to software or hardware. The "unit" or "module" may be constructed either to be stored in an addressable storage medium or to execute one or more processors. Therefore, the "unit" or "module" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" or "module" may be either combined into a smaller number of elements, "unit", or "module" or divided into a larger number of elements, "unit", or "module". Moreover, the elements and "units" or "modules" may be implemented to reproduce one or more central processing units (CPUs) within a device or a security multimedia card.

Hereinafter, a method of improving a performance of a user equipment (UE) through an inter-base station load balance, in a heterogeneous network (HetNet) wherein a macro cell having a high power output and a small cell having a lower power output share the same frequency is described.

Typically, the macro cell has a coverage of a wide area because the macro cell has a relatively high power output. In contrast, the small cell has a smaller coverage area narrower than the macro cell because the small cell has a relatively low power output. However, the small cell has advantages it may be significantly more inexpensive.

The small cell is mainly used to cover a coverage hole which is not covered by the macro cell, or used to absorb a load of the macro cell. However, since the coverage of the small cell is small, there is a problem in which the small cell cannot effectively absorb the load of the macro cell.

3rd generation partnership project (3GPP) long term evolution (LTE) standard employs an enhanced inter-cell interference coordination (eICIC) or a time-domain ICIC technique to enable the small cell to absorb the load of the macro cell effectively.

In a cellular wireless communication system, it is common that a cell having the highest downlink reception power is designated as a serving cell for a given user generally, and a corresponding user receives data traffic from the serving cell. In contrast, the eICIC technique is a technique for designating the small cell as the serving cell for a user when downlink reception power of the macro cell is larger than that of the small cell and for enabling the user to download a data traffic from the corresponding small cell.

FIG. 1 is a view illustrating a coverage of the small cell, when the eICIC technique is used according to an embodiment of the present disclosure.

Referring to FIG. 1, when the eICIC technique is used, a boundary of a coverage of the existing small cell 110 may be expanded to a boundary of a reference numeral 120. As a result, the small cell absorbs more users of the macro cell, and the macro cell's load may be distributed to the small cell.

Meanwhile, the users placed in the coverage of the small cell expanded area 120 may have interference due to the macro cell having a signal larger than that of the small cell, and wireless channel quality may be largely degraded. Therefore, the users placed in the coverage of the expanded small cell area 120 may experience difficulties in performing a wireless communication.

In order to resolve the aforementioned technical problems, the 3GPP LTE eICIC technique provides an almost blank subframe (ABS) pattern technique and a resource restriction technique.

According to the ABS pattern technique, the macro cell provides information referred to as an ABS pattern to the small cell experiencing interference from a corresponding cell. The pattern information includes 40 bits of a bit stream associated with an eICIC standard of 3GPP LTE frequency division duplex (FDD), and refers to an existence of a restriction of transmission power (i.e., Tx power) of the macro cell, which is repeated every 40 ms period. For example, a value of a first bit among 40 bits may refer to an existence of the transmission power (i.e., Tx power) of the macro cell in a first subframe. For example, when a corresponding value is 1(=ABS), the macro cell may reduce the transmission power (i.e., Tx power), and when the corresponding value is 0(=non-ABS), the macro cell may not be restricted by a specific transmission power (i.e., Tx power).

Typically, according to the eICIC technique, since the UE placed in the expanded coverage of the small cell has interference due to the macro cell, receiving wireless resources during only an ABS when the macro cell reduces the transmission power (i.e. Tx power) is advantageous in securing wireless channel quality.

That is, the ABS pattern informs whether the transmission power (i.e., Tx power) of the macro cell is reduced to the small cell, and thus is a enables the users placed in the expanded coverage of the small cell to perform a wireless communication stably.

Meanwhile, the resource restriction technique is a technique for including a user to measure a channel during only a specific subframe.

The resource restriction technique may include three types of patterns.

A first pattern includes 40 bit information, and restricts a subframe when a user measures reference signal received power (RSRP) and reference signal received quality (RSRQ) for the serving cell and determines a radio link failure (RLF).

A second pattern includes a 40 bit information, and restricts a subframe when a user measures RSRP and RSRQ for a neighbor cell.

A third pattern includes two pieces of 40 bit information. A first 40 bit information may inform of a subframe used to measure first channel quality (i.e., channel quality indicator (CQI). A second 40 bit information may inform of a subframe used to measure second channel quality.

According to a normal eICIC technique, a network may enable the user to divide and measure channel quality in the ABS and channel quality of a non-ABS, using the third pattern. Through this, when the network allocates a wireless resource to the user, the network may allocate a resource and determine a modulation and coding scheme (MCS) by applying proper channel quality according to whether the ABS of a corresponding subframe exists or not.

It is necessary to operate the third pattern effectively considering that the ABS pattern may change according to a time and a signaling overhead that is incurred when the third pattern is transferred to the user.

Meanwhile, the 3GPP LTE standard employs even a further eICIC (FeICIC) technique so as to provide a more effective load balance function.

In the FeICIC technique, the base station transfers inter-cell information to the UE through a signaling. Therefore, the FeICIC technique removes interference by a cell-specific reference signal (CRS), which is generated from an interference cell, and, thus, the FeICIC technique improves channel quality.

Specially, when the macro cell implements the ABS, since channel quality of the UE in the small cell may be improved, it is expected to increase the coverage area of the small cell compared to the existing eICIC.

As described below, for convenience, the UEs are divided into three types and referred to as following.
- legacy UE (or a first type UE): UE which does not support eICIC/FeICIC technique.
- eICIC UE (or a second type UE): UE which supports eICIC technique.
- FeICIC UE (or a third type UE): UE which supports FeICIC technique.

An aspect of the present disclosure is to provide a method and an apparatus for an effective inter-cell load balance between a macro cell and a small cell in a HetNet in which the macro cell and the small cell are mixed. The present specification is described based on a 3GPP LTE FDD wireless communication system, but the present specification may be applied to other communication systems. In addition, the present specification is described based on an expansion of the coverage of the small cell in a network in which the macro cell and the small cell are mixed, but the present specification may be applied to another type of cell configuration. In the present specification, for convenience, a pico cell is described as an example of the small cell, but is not limited thereto. An embodiment of the present disclosure may be applied to a node such as a remote radio head (RRH) and a transmission point (TP).

Figure 2:
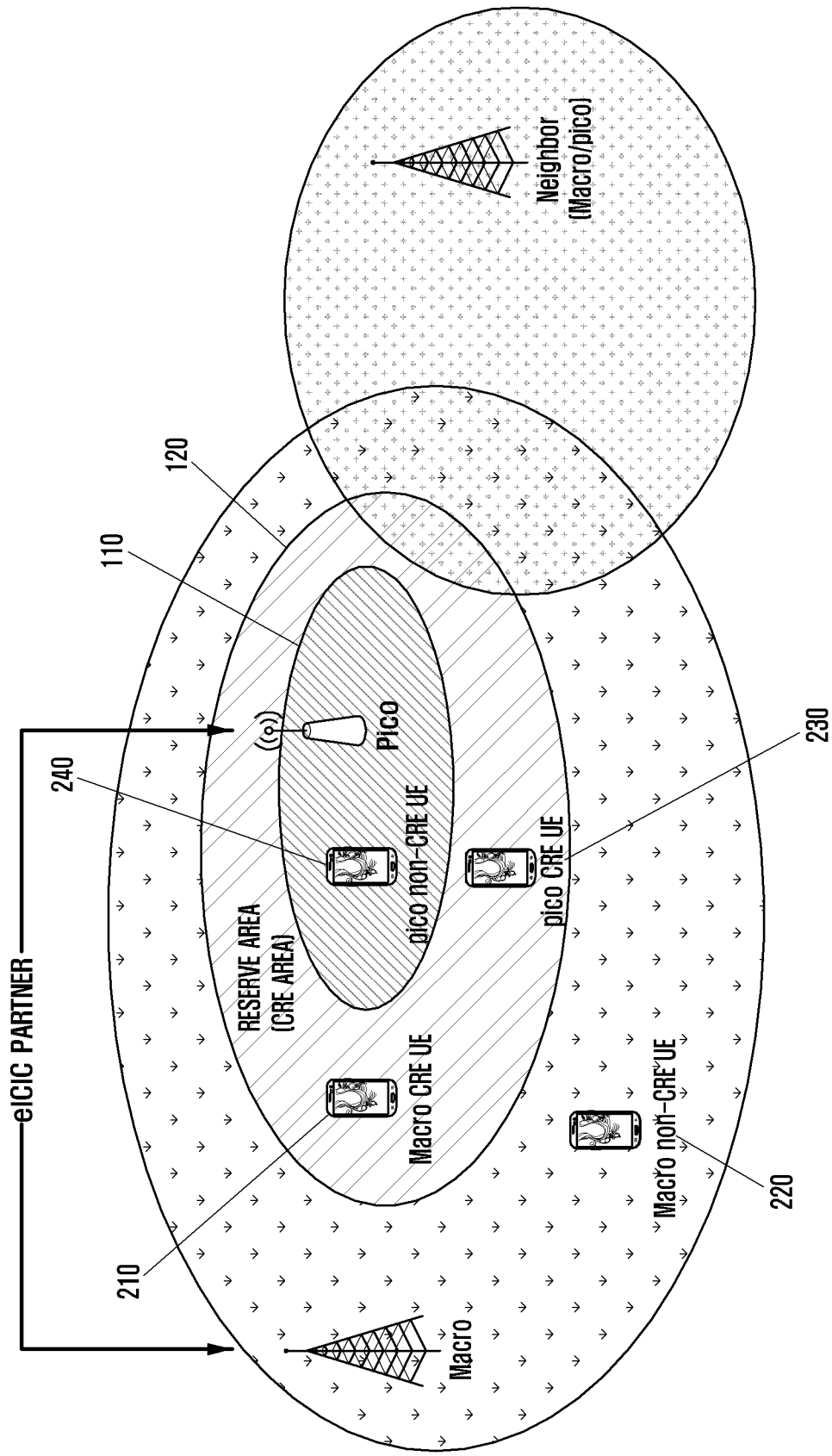
FIG. 2 is a view illustrating a method of managing a cell area according to an embodiment of the present disclosure.

FIG. 2 is a view illustrating a method of managing a cell area according to an embodiment of the present disclosure.

Hereinafter, a cell area expansion after cell area 120 of the pico cell compared to a cell area expansion before cell area 110 of the pico cell is referred to as a cell expansion area or a cell reserve (CRE) area.

In this case, according to an embodiment of the present disclosure, the cell area expansion after cell area 120 may be the cell area expansion before cell area 110 is not included.

A UE which placed in a CRE of the pico cell or an area of a possible cell expansion of the pico cell, and of which a serving cell is the macro cell is referred to as a macro CRE UE or a macro reserve area UE 210.

Among UEs of which the serving cell is the macro cell, a UE excluding the macro CRE UE is referred to as a macro non-CRE UE or a macro non-reserve area UE 220.

A UE placed in the CRE of the pico cell and of which a serving cell is the pico cell is referred to as a pico CRE UE or a pico reserve area UE 230.

Among UEs of which the serving cell is the pico cell, a UE excluding the pico CRE UE is referred to as a pico non-CRE UE or a pico non-reserve area UE 240.

In the method of managing the cell area shown in FIG. 2, the coverage expandable area (i.e., the reserve area or the CRE area) in the pico cell is operated as a shared cell area of the macro cell and the pico cell, rather than a cell area of the macro cell or the pico cell itself.

In an embodiment of the present disclosure shown in FIG. 2, a UE that belongs to the reserve area is determined through a unique UE management method. The macro cell determines a macro UE in the reserve area (i.e., a macro CRE UE) and a macro UE which is not in the reserve area (i.e., a macro non-CRE UE).

In the same manner, the pico cell determines a pico UE in the reserve area (i.e., a pico CRE UE) and a pico UE which is not in the reserve area (i.e., a pico non-CRE UE).

According to an embodiment of the present disclosure shown in FIG. 2, when a load difference between the macro cell and the pico cell is larger than a threshold, a reserve area UE served by a serving cell may be forcibly handed over to a cell having a lower load.

Meanwhile, since a cellular system applies a hysteresis to a handover generation condition so as to prevent rapid handovers, a shared cell area is formed.

For example, a shared cell area formed in an area of the macro cell and the pico cell becomes the macro cell area and becomes the pico cell area, and, thus, when the UE moves in a corresponding area, a handover is not generated. The shared cell area prevents the rapid handovers. However, there is a disadvantage because the UE cannot have an optimal cell as a serving cell based on a signal intensity. For example, the pico UE may be placed at a position where the received macro cell signals are stronger as compared to the macro UE.

In the embodiment shown in FIG. 2, since a method of operating the shared cell area (or the reserve area) more widely, which is in the boundary of the macro cell and the pico cell, is used, there is a concern that the UE may not have the optimal cell as the serving cell based on the received signal intensity.

Figure 3:
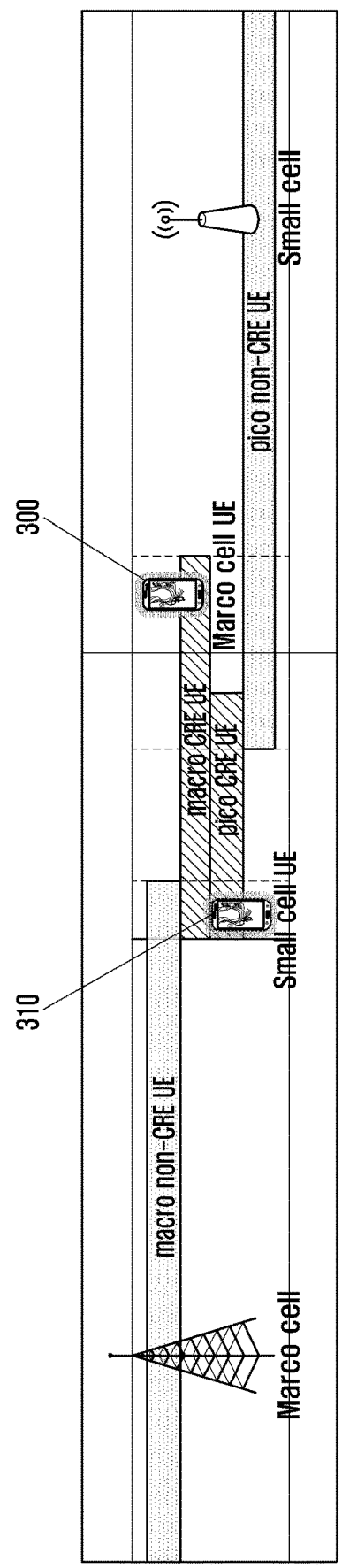
FIG. 3 is a view illustrating an area where an eICIC user equipment (UE) is placed according to each group, according to an embodiment of the present disclosure.

FIG. 3 is a view illustrating an area where the eICIC UE is placed according to each group, according to an embodiment of the present disclosure.

Referring to FIG. 3, the group includes four groups of the macro non-CRE UE, the macro CRE UE, the pico non-CRE UE and the pico CRE UE. The definitions of each group are described with reference to FIG. 2, and thus detailed descriptions concerning the definitions of each group are omitted.

An area overlapping a coverage area of the macro CRE and a coverage area of the pico CRE UE corresponds to the reserve area (i.e., CRE area).

Referring to FIG. 3, for example, in a case of the UE, a macro UE 300 may be placed in a position where the pico cell signal is received better than a pico UE 310. However, since an unnecessary wireless resource waste is caused because of a degraded wireless channel quality, it may be preferable to swap the serving cells of the UEs 310 and 320.

Meanwhile, according to an embodiment of the present disclosure, an A3 event of 3GPP LTE standard occurs to divide the reserve area UE. In order to reduce an RSRP information report (referred to as a measurement report (MR) in 3GPP LTE) of an unnecessary UE, the UE transmits the MR once when an A3 event entrance condition is satisfied.

However, since the same A3 event is used for determining handover (HO) with respect to another cell, the transmitting of the MR only once may cause degradation of the HO quality.

Hereinafter, according to an embodiment of the present disclosure, a method of an effective inter-cell load balance between a macro cell and a pico cell in a HetNet system is described.

In another embodiment of the present disclosure described below, a method of operating a wireless communication system capable of maximizing a load balance effect by minimizing wireless resource waste, maintaining handover quality and differentially operating an eICIC UE and an FeICIC UE is described.

System parameters related to an operation according to an embodiment of the present disclosure are described below.
- eICIC ON/OFF parameter may turn on and off an eICIC operation.
  - CRE ON/OFF parameter is effective to only an eICIC ON, and may turn on and off a pico cell coverage expansion function.
- mobility load balancing (MLB) ON/OFF parameter may turn on and off a forced handover function between the macro cell and the pico cell.

Figure 4:
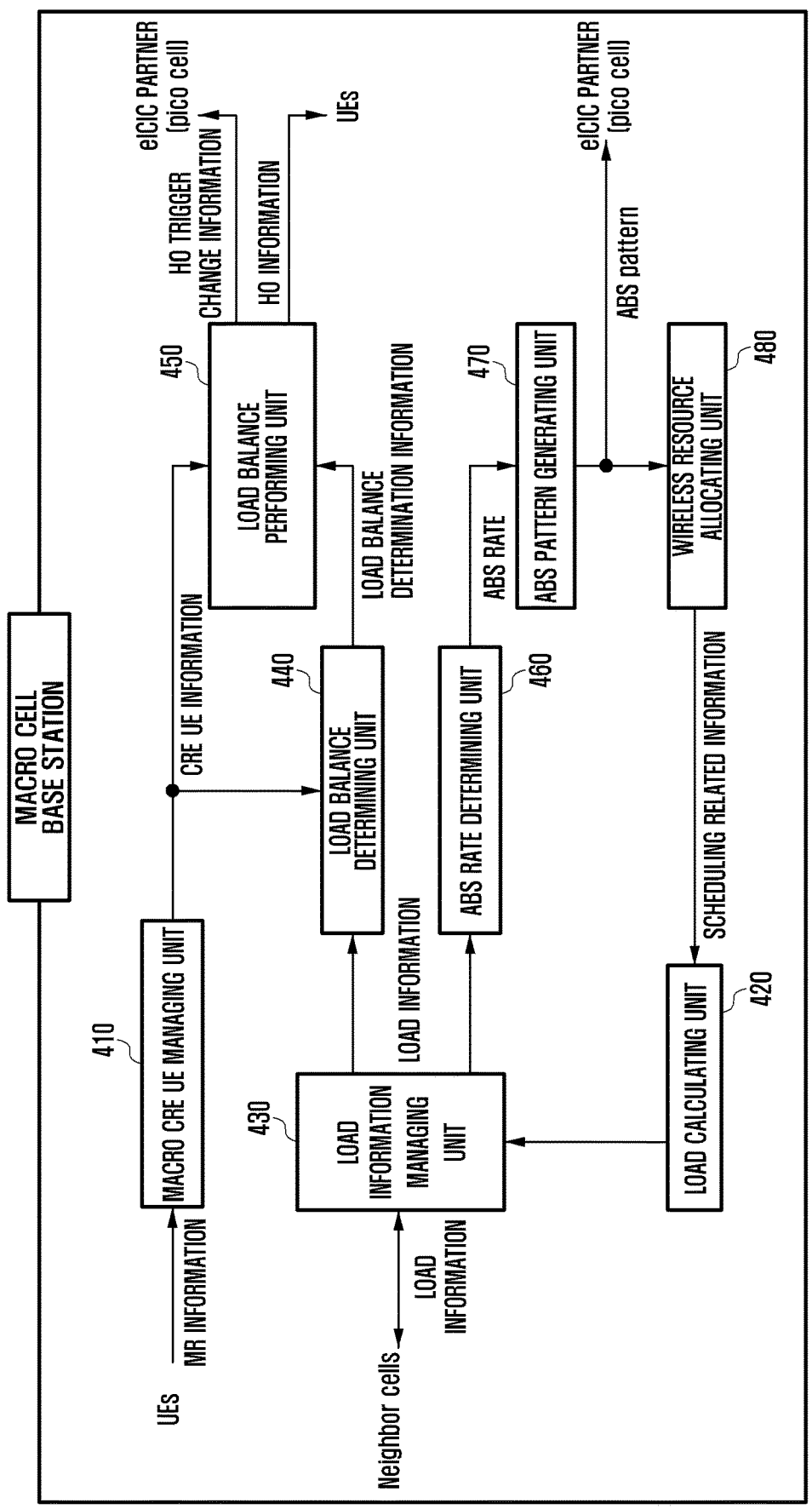
FIG. 4 is a block diagram of a macro cell base station according to an embodiment of the present disclosure.

FIG. 4 is a block diagram of a macro cell base station according to an embodiment of the present disclosure.

Referring to FIG. 4, the macro cell base station according to an embodiment of the present disclosure includes a macro CRE UE managing unit 410, a load calculating unit 420, a load information managing unit 430, a load balance determining unit 440, a load balance performing unit 450, an ABS rate determining unit 460, an ABS rate pattern generating unit 470, and a wireless resource allocating unit 480.

The macro CRE UE managing unit 410 receives MR information from a UE of which a serving cell is a macro cell, divides the UE into a macro CRE UE and a macro non-CRE UE, and manages the UE. In addition, the macro CRE UE managing unit 410 outputs CRE UE information to transfer the CRE UE information to the load balance determining unit 440 and the load balance performing unit 450.

The load information managing unit 430 receives neighbor cell load information from a neighbor base station and load information of the macro cell from the load calculating unit 420 of the macro cell thereof, and manages load information according to each cell. In addition, the load information managing unit 430 outputs the load information to the load balance determining unit 440 and the ABS rate determining unit 460.

The load calculating unit 420 receives scheduling information from the wireless resource allocating unit 480, and calculates a load of the macro cell. In addition, the load calculating unit 420 outputs the corresponding result to the load information managing unit 430.

The load balance determining unit 440 receives the load information of the macro cell and the neighbor cell from the load information managing unit 430 and the CRE UE information from the CRE UE managing unit 410, determines whether the load of the macro cell is to be distributed to the neighbor cell, and outputs load balance determination information to the load balance performing unit 450.

The load balance performing unit 450 receives the CRE UE information from the macro CRE UE managing unit 410 and the load balance determination information from the load balance determining unit 440, and performs a load balance operation. The load balance performing unit 450 may output HO trigger change information to an eICIC partner pico cell base station, and may transfer HO information to the UE to instruct a performance of the handover. The HO trigger according to an embodiment of the present disclosure may refer to a reference line through which a HO from the macro cell base station to the pico cell base station or from the pico cell base station to the macro cell base station is performed.

The ABS rate determining unit 460 receives the load information of the macro cell and the neighbor cell from the load information managing unit 430, determines an ABS rate, and outputs ABS rate information to the ABS pattern generating unit 470.

The ABS pattern generating unit 470 receives the ABS rate from the ABS rate determining unit 460, determines the ABS pattern, and outputs the ABS pattern to the wireless resource allocating unit 480 and the eICIC partner pico cell base station.

The wireless resource allocating unit 480 receives the ABS pattern from the ABS pattern generating unit 470, schedules a wireless resource in consideration of the ABS pattern, informs of the scheduled wireless resource to the UE, and outputs scheduling related information to the load calculating unit 420.

Meanwhile, in the above, the macro cell base station includes a plurality of other blocks that performs different functions, but are not limited thereto. For example, the macro cell base station includes a transmitting and receiving unit that transmits and receives a signal to and from the UE or the pico cell base station. In addition, a control unit may be implemented to perform all of the functions.

For example, the control unit may configure a variable reserve area for the second base station, and may balance the load between the base stations according to the reserve area, for the inter-cell load balance. In this case, the UE of which the serving base station is the first base station may be divided into a first base station reserve area UE and a first base station non-reserve area UE and managed. The first base station may be the macro cell base station and the second base station may be the pico cell base station.

In addition, the UE may include a first type UE which does not support an eICIC function and a FeICIC, a second type UE which supports the eICIC function, and a third type UE which supports the FeICIC function.

In addition, the control unit may determine whether a forced handover is necessary, and perform a handover on a random UE to the second base station when the forced handover is necessary. In this case, the control unit may determine whether the forced handover is necessary based on at least one of an activation-or-not of an inter-cell interference control function, an existence-or-not of an inter-cell interference control partner cell, an ABS rate that is currently being applied, and an existence of a macro cell reserve area UE. In this case, the control unit may control to select at least one UE for the forced handover, request a measurement report to the selected UE, and receive the measurement report from the selected UE correspondingly to the request.

In addition, the control unit may select a UE positioned in a reserve area for a random second base station having a load is equal to or lower than a predetermined threshold value, as a UE for the load balance. In addition, the control unit may determine whether the reserve area is in a movable state when the forced handover is not necessary or the measurement report is not received from the selected UE, and when the reserve area is in the movable state, the control unit may control to change a handover reference line between the first base station and the second base station to shift the reserve area toward the first base station or the second base station. In this case, the control unit may determine that the reserve area is in the movable state, when the eICIC function and a CRE function is in an activated state. The control unit may change the handover reference line by changing an offset value for an A3 event for the first type UE, the second type UE or the third type UE. In this case, a movement range of the handover reference line for the third type UE is wider than a movement range of the handover reference line for the second type UE.

Figure 5:
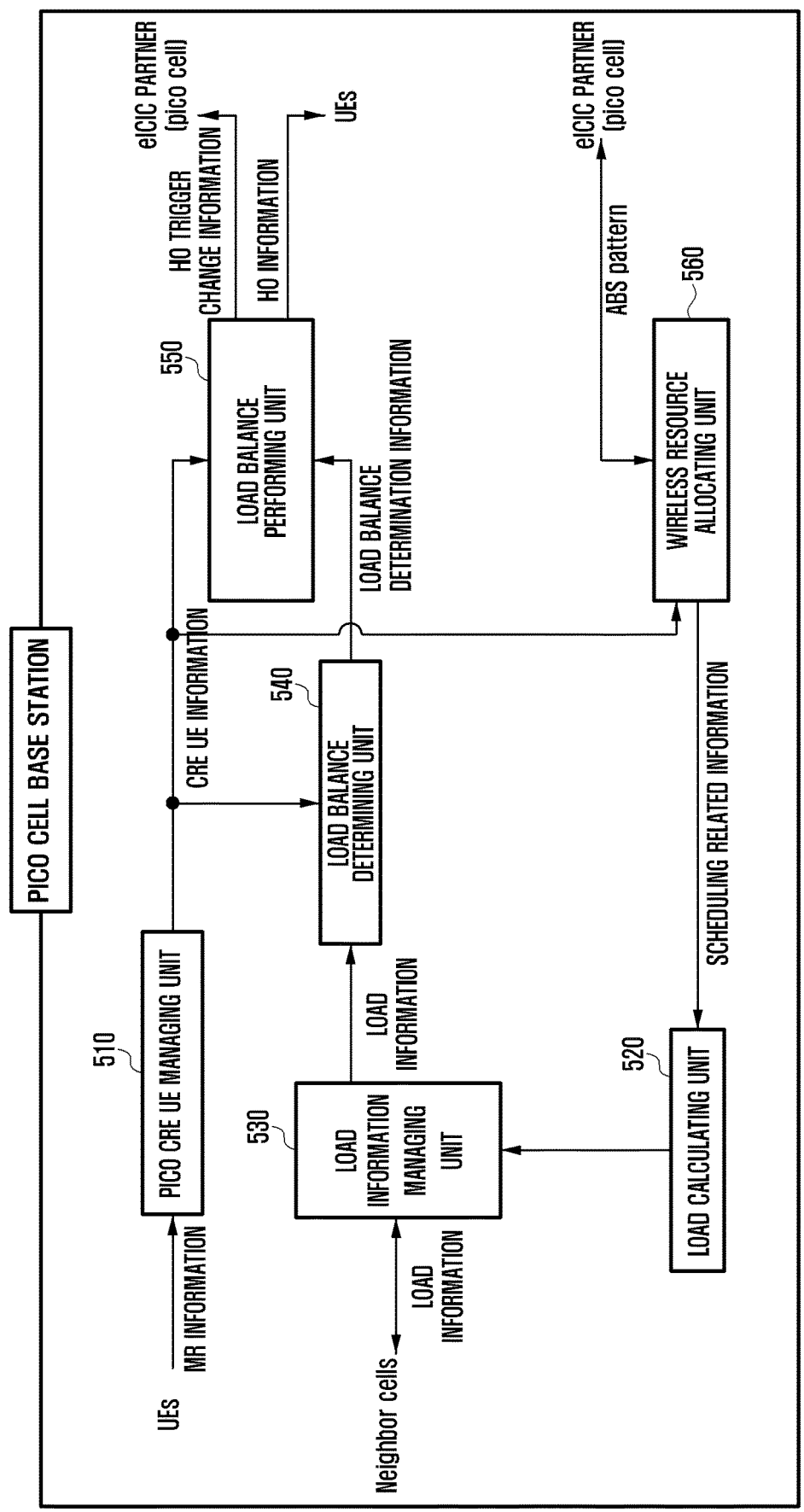
FIG. 5 is a block diagram of a pico cell base station according to an embodiment of the present disclosure.

FIG. 5 is a block diagram of a pico cell base station according to an embodiment of the present disclosure.

Referring to FIG. 5, the pico cell base station according to an embodiment of the present disclosure includes a pico CRE UE managing unit 510, a load calculating unit 520, a load information managing unit 530, a load balance determining unit 540, a load balance performing unit 550, and a wireless resource allocating unit 560.

The pico CRE UE managing unit 510 receives MR information from a UEs served by the pico cell, divides the UEs into pico CRE UEs and pico non-CRE UEs, and manages the UEs. In addition, the pico CRE UE managing unit 510 outputs CRE UE information to transfer the CRE UE information to the load balance determining unit 540 and the load balance performing unit 550.

The load information managing unit 530 receives neighbor cell load information from a neighbor base station and load information of the pico cell from the load calculating unit 520, and manages load information according to each cell. In addition, the load information managing unit 530 outputs the corresponding information to the load balance determining unit 540.

The load calculating unit 520 receives scheduling information from the wireless resource allocating unit 560, and calculates a load of the pico cell. In addition, the load calculating unit 520 outputs the corresponding result to the load information managing unit 530.

The load balance determining unit 540 receives the load information of the pico cell and the neighbor cell from the load information managing unit 530 and the CRE UE information from the CRE UE managing unit 510, determines whether the load of the pico cell is to be distributed to the neighbor cell, and outputs load balance determination information to the load balance performing unit 550.

The load balance performing unit 550 receives the CRE UE information from the pico CRE UE managing unit 510 and the load balance determination information from the load balance determining unit 540, and performs a load balance operation. The load balance performing unit 550 may output HO trigger change information to an eICIC partner macro cell base station, and may transfer HO information to the UE to instruct a performance of the handover.

The wireless resource allocating unit 560 receives an ABS pattern from the eICIC partner macro cell base station, schedules a wireless resource in consideration of the ABS pattern, informs of the scheduled wireless resource to the UE, and outputs scheduling related information to the load calculating unit 520.

Meanwhile, in the above, the pico cell base station includes a plurality of other blocks performs different functions, but they are not limited thereto. For example, the pico cell base station may include a transmitting and receiving unit that transmits and receives a signal to and from the UE or the macro cell base station. In addition, a control unit may be implemented to perform all of the functions.

Meanwhile, when the eICIC is in an off state or the CRE is in an off state, the macro CRE UE managing unit 410 in the macro cell base station manages all UEs as the non-CRE UEs. Meanwhile, when the eICIC is in an on state and the CRE is in an on state, the macro CRE UE managing unit 410 divides a UE satisfying three following conditions into the macro CRE UE or the macro non-CRE UE and manages the UE.

1. The UE has a corresponding carrier is a primary cell (PCell).
2. The UE does not have a guaranteed bit rate (GBR) bearer.
3. The UE is an eICIC UE or an FeICIC UE (i.e., not legacy UE).

The macro CRE UE managing unit 410 always manages a UE that does not satisfy any of the three above-mentioned types as the macro non-CRE UE.

Figure 6A:
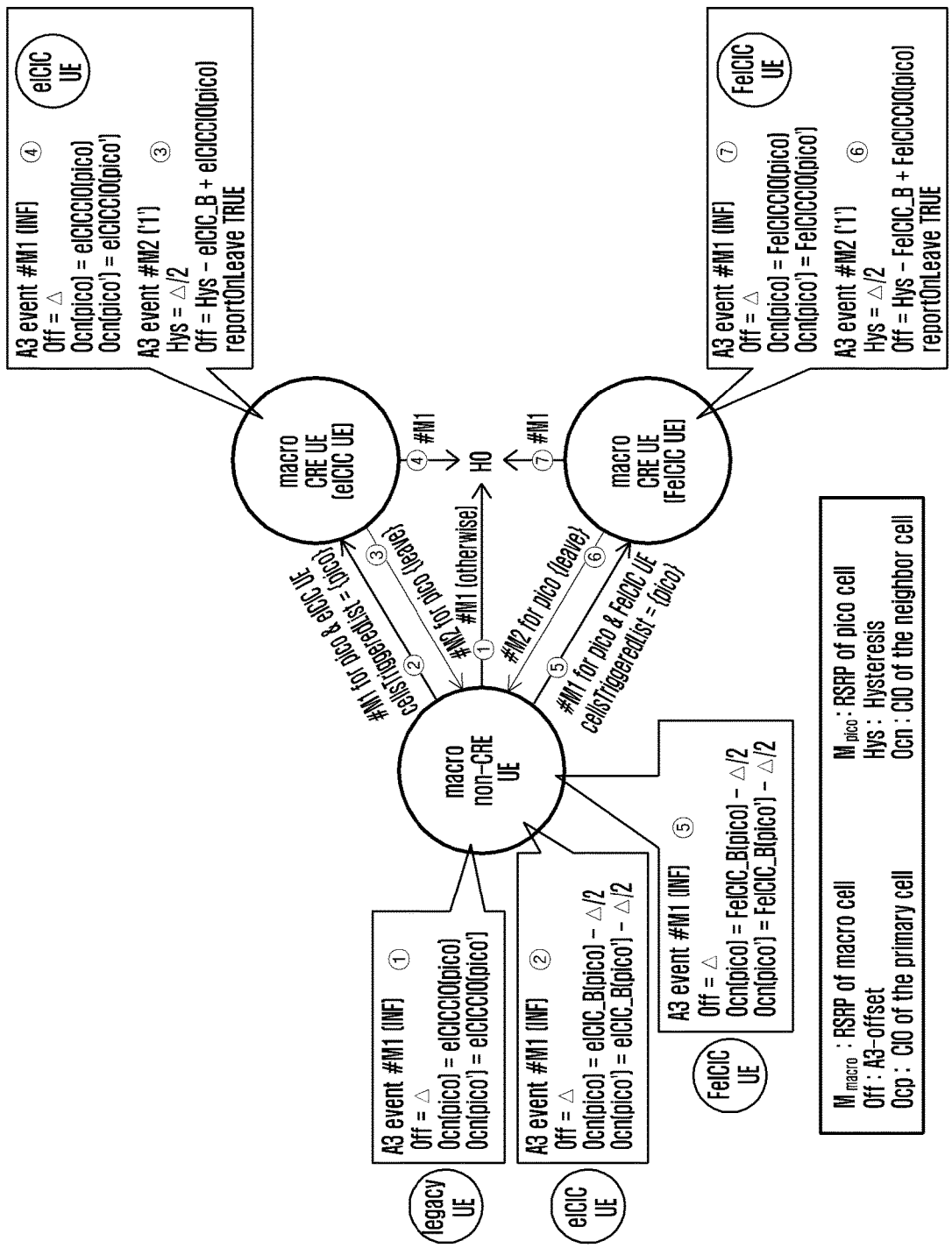

FIGS. 6A and 6B are views illustrating a method of managing the UE satisfying the three above-mentioned conditions by dividing the UE into the macro CRE UE and the macro non-CRE UE by the macro CRE UE managing unit according to an embodiment of the present disclosure.

Referring to FIGS. 6A and 6B, a UE that accesses to the macro cell for the first time may be determined as the macro non-CRE UE.

The eICIC UE which is the macro non-CRE UE configures a cell individual offset (CIO) value for at least one eICIC partner pico cell as (eICICBound−Δ/2) using an iICIC Bound value (=eICIC_B) corresponding to a corresponding pico cell. Each pico cell may have different eICICBound values, and the eICICBound may refer to a boundary of the maximum coverage area of the corresponding pico cell. A corresponds to an A3 offset value generally used to prevent a HO ping-pong.

For example, when the eICIC UE is close enough to the eICIC partner pico cell to satisfy a "macro RSRP+Δ≤pico RSRP+(eICICBound−Δ/2)" condition as shown as an arrow ② of FIGS. 6A and 6B, the eICIC UE performs an MR report. In addition, the macro CRE UE managing unit determines the corresponding eICIC UE as the macro CRE UE.

The eICIC UE (i.e., the macro CRE UE) replaces the CIO value for all eICIC partner pico cells as an eICICCIO value corresponding to the pico cell.

When the eICIC UE is close enough to the eICIC partner pico cell to satisfy a "RSRP+Δ≤pico RSRP+eICICCIO" condition as shown as an arrow ④ of FIGS. 6A and 6B, the eICIC UE performs the MR report, and the corresponding UE performs the handover to the eICIC partner pico cell.

The eICIC UE configures one more A3 event, in this case, a hysteresis value is Δ/2, the A3 offset value is "Hysteresis−eICIC_B+eICICCIO", and "reportOnLeave TRUE" is configured.

The eICIC UE reports an MR because an entering condition "(macro RSRP+(Δ/2−eICIC_B+eICICCIO)+Δ/2≤pico RSRP+eICICCIO)" is directly satisfied for the added A3 event. When the eICIC UE is far enough from the eICIC partner pico cell to satisfy a leaving condition "(macro RSRP+(Δ/2−eICIC_B+eICICCIO)−Δ/2≥pico RSRP+eICICCIO)" as shown as an arrow ③ of FIGS. 6A and 6B, the eICIC UE reports the MR again.

When the MR report is received, the macro CRE UE managing unit determines and manages the corresponding eICIC UE as the macro non-CRE UE, and replaces and configures the corresponding eICIC UE as the A3 event for the eICIC UE, which is the macro non-CRE UE.

The FeICIC UE (i.e., the macro non-CRE UE) configures a CIO value for at least one eICIC partner pico cell as "(FeICICBound−Δ/2)" using a FeICICBound value (=FeICIC_B)" corresponding to the corresponding pico cell. Each pico cell may have different FeICICBound values, and the FeICICBound may refer to a boundary of a maximum coverage area of the corresponding pico cell.

When the FeICIC UE is close enough to the eICIC partner pico cell to satisfy a "RSRP+Δ≤pico RSRP+(FeICICBound−Δ/2)" condition as shown as an arrow ⑤ of FIGS. 6A and 6B, the FeICIC UE performs an MR report. In addition, the macro CRE UE managing unit determines the corresponding FeICIC UE as the macro CRE UE.

The FeICIC UE (i.e., the macro CRE UE) replaces the CIO value for all eICIC partner pico cells as an FeICICCIO value corresponding to the pico cell. When the FeICIC UE is close enough to the eICIC partner pico cell to satisfy a "RSRP+Δ≤pico RSRP+FeICICCIO" condition as shown as an arrow ⑦ of FIGS. 6A and 6B, the FeICIC UE performs the MR report, and the corresponding UE performs the handover to the eICIC partner pico cell.

In the same manner, the FeICIC UE (i.e., the macro CRE UE) configures one more A3 event, in this case, a hysteresis value is Δ/2, the A3 offset value is "Hysteresis−FeICIC_B+FeICICCIO", and "reportOnLeave TRUE" is configured.

The FeICIC UE reports an MR because an entering condition "(macro RSRP+(Δ/2−FeICIC_B+FeICICCIO)+Δ/2≤pico RSRP+FeICICCIO)" is directly satisfied for the added A3 event. When the FeICIC UE is far enough from the eICIC partner pico cell to satisfy a leaving condition "(macro RSRP+(Δ/2−FeICIC_B+FeICICCIO)−Δ/2≥pico RSRP+FeICICCIO)", the FeICIC UE reports the MR again.

When the MR report according to the leaving condition is received, the macro CRE UE managing unit starts to determine and manage the corresponding FeICIC UE as the macro non-CRE UE, and replaces and configures the corresponding FeICIC UE as the A3 event for the FeICIC UE which is the macro non-CRE UE.

Meanwhile, when the eICIC is in an off state or the CRE is in an off state, the pico CRE UE managing unit in the pico cell base station manages all UEs as the non-CRE UEs. Meanwhile, when the eICIC is in an on state and the CRE is in an on state, the pico CRE UE managing unit divides a UE satisfying three following conditions into the pico CRE UE or the pico non-CRE UE and manages the UE.

The UE has a corresponding carrier is a PCell.
The UE does not have a GBR bearer.
The UE should be an eICIC UE or an FeICIC UE (i.e., not a legacy UE).

The pico CRE UE managing unit always manages a UE that does not satisfy any of the three above-mentioned types as the macro non-CRE UE.

Figure 7A:
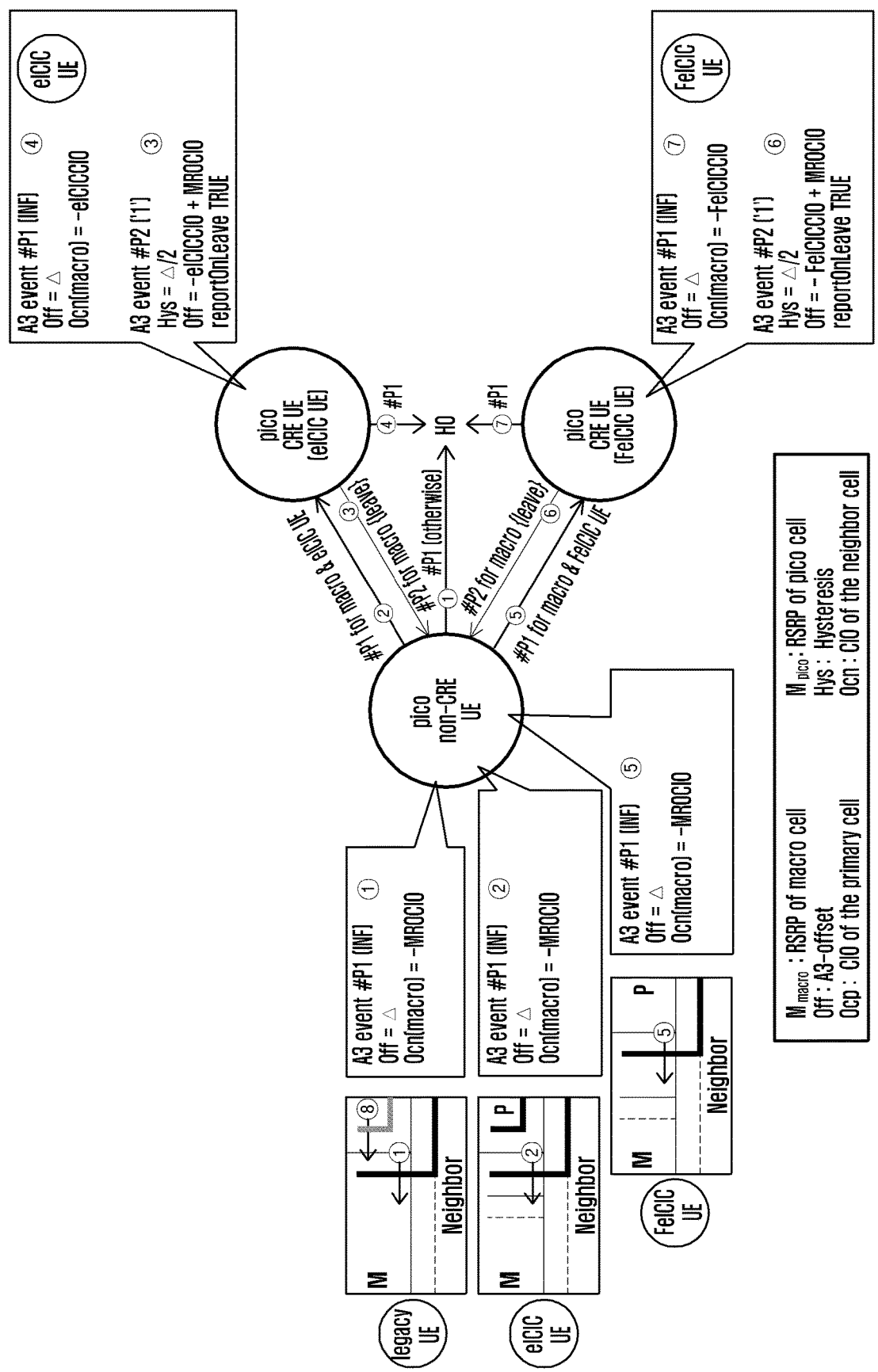
FIGS. 7A and 7B are views illustrating a method of managing the UE by dividing the UE into a pico CRE UE and a pico non-CRE UE by a pico CRE UE managing unit, according to an embodiment of the present disclosure.
Figure 7B:
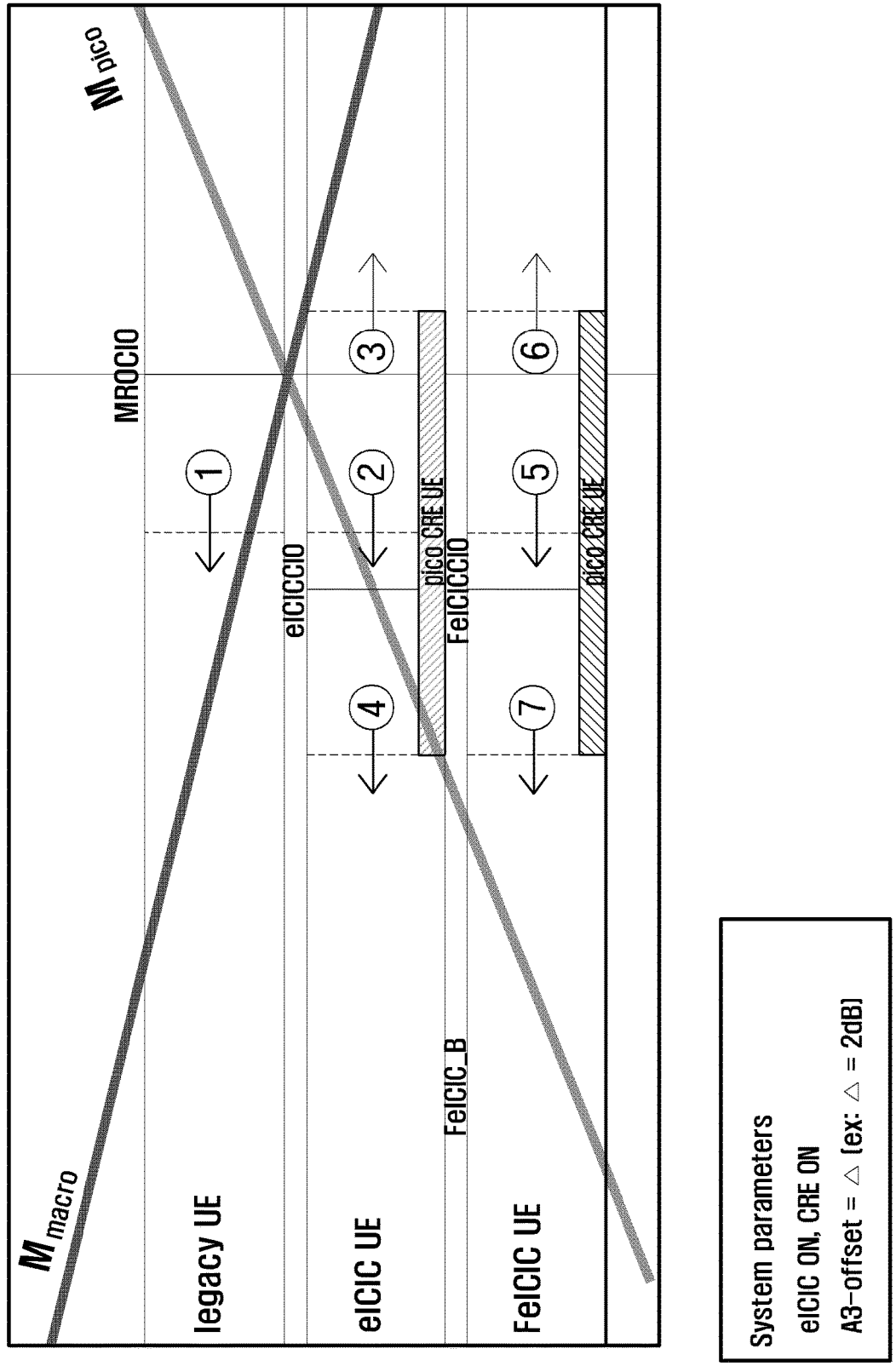

FIGS. 7A and 7B are views illustrating a method of managing the UE satisfying the three above-mentioned conditions by dividing the UE into the pico CRE UE and the pico non-CRE UE by the pico CRE UE managing unit according to an embodiment of the present disclosure.

Referring to FIGS. 7A and 7B, a UE that accesses to the pico cell for the first time may be determined as the pico non-CRE UE.

The eICIC UE (i.e., the pico non-CRE UE configures a CIO value for the eICIC partner macro cell as −MROCIO value. In order to prevent a confusion by the same MROCIO variable applied to FIGS. 6A to 7B, a minus sign is added.

When the eICIC UE is close enough to the eICIC partner macro cell to satisfy a "pico RSRP+Δ≤macro RSRP+(−MROCIO)" condition as shown as an arrow ② of FIGS. 7A and 7B, the eICIC UE performs an MR report. In addition, the pico CRE UE managing unit may determine the corresponding eICIC UE as the pico CRE UE.

The eICIC UE replaces the CIO value for the eICIC partner macro cell as the −eICICCIO value corresponding to the corresponding macro cell. In order to prevent a confusion by the same eICICCIO variable applied to FIGS. 6A to 7B, a minus sign is added.

When the eICIC UE is close enough to the eICIC partner macro cell to satisfy a "pico RSRP+Δ≤macro RSRP+(−eICICCIO)" condition as shown as an arrow ④ of FIGS. 7A and 7B, the eICIC UE performs an MR report. In addition, the corresponding UE performs a handover to the eICIC partner macro cell.

The eICIC UE configures one more A3 event, in this case, a hysteresis value is Δ/2, the A3 offset value is "eICICCIO+MROCIO", and "reportOnLeave TRUE" is configured.

The eICIC UE reports an MR because an entering condition "(pico RSRP+(−eICICCIO+MROCIO)+Δ/2≤macro RSRP−eICICCIO)" is directly satisfied for the added A3 event. When the eICIC UE is far enough from the eICIC partner macro cell to satisfy a leaving condition "(pico RSRP+(−eICICCIO+MROCIO)−Δ/2≤macro RSRP−eICICCIO)" as shown as an arrow ③ of FIGS. 7A and 7B, the eICIC UE reports the MR again.

When the MR report according to the leaving condition is received, the pico CRE UE managing unit determines and manages the corresponding eICIC UE as the pico non-CRE UE, and replaces and configures the corresponding eICIC UE as the A3 event for the eICIC UE (i.e., the pico non-CRE UE).

The FeICIC UE (i.e., the pico non-CRE UE) configures a CIO value for the eICIC partner macro cell as −MROCIO value. In order to prevent a confusion by the same MROCIO variable applied to FIGS. 6A to 7B, a minus sign is added. When the FeICIC UE is close enough to the eICIC partner macro cell to satisfy a "pico RSRP+Δ≤macro RSRP+(−MROCIO)" condition as shown as an arrow ⑤ of FIGS. 7A and 7B, the FeICIC UE performs an MR report. In addition, the pico CRE UE managing unit determines the corresponding FeICIC UE as the pico CRE UE.

The FeICIC UE (i.e., the pico CRE UE) replaces the CIO value for the eICIC partner macro cell as the FeICICCIO' value corresponding to the corresponding macro cell. In order to prevent a confusion by the same FeICICCIO variable applied to FIGS. 6A to 7B, a minus sign is added.

When the FeICIC UE is close enough to the eICIC partner macro cell to satisfy a "pico RSRP+Δ≤macro RSRP+(−FeICICCIO)" condition as shown as an arrow ⑦ of FIGS. 7A and 7B, the FeICIC UE performs an MR report. In addition, the corresponding UE performs a handover to the eICIC partner macro cell.

The FeICIC UE (i.e., the pico CRE UE) configures one more A3 event, in this case, a hysteresis value is Δ/2, the A3 offset value is "FeICICCIO+MROCIO", and "reportOnLeave TRUE" is configured.

The FeICIC UE reports an MR because an entering condition "(pico RSRP+(−FeICICCIO+MROCIO)+Δ/2≤macro RSRP−FeICICCIO)" is directly satisfied for the added A3 event. When the FeICIC UE is far enough from the eICIC partner macro cell to satisfy a leaving condition "(pico RSRP+(−FeICICCIO+MROCIO)−Δ/2≤macro RSRP−FeICICCIO)" as shown as an arrow ⑥ of FIGS. 7A and 7B, the FeICIC UE reports the MR again.

When the MR report according to the leaving condition is received, the pico CRE UE managing unit determines and manages the corresponding FeICIC UE as the pico non-CRE UE, and replaces and configures the corresponding FeICIC UE as the A3 event for the FeICIC UE which is the pico non-CRE UE.

Figure 8:
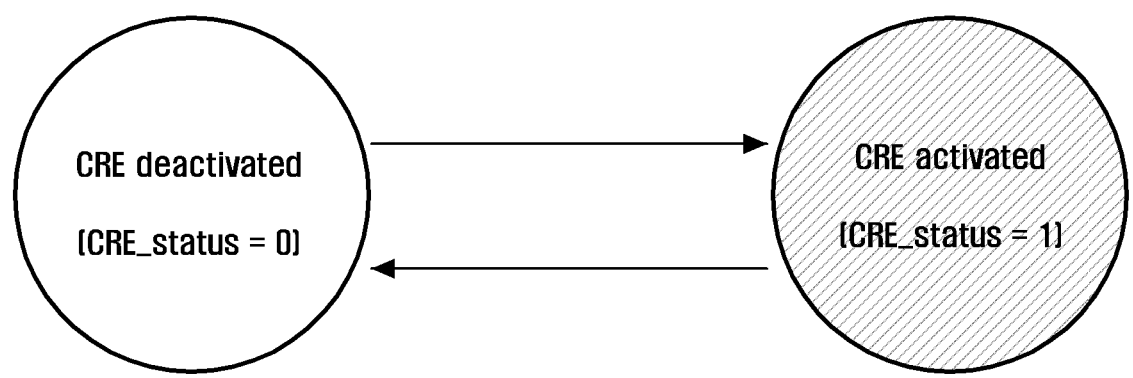
FIG. 8 is a view illustrating a state transition diagram used in managing a CRE state by a load balance determining unit of the macro cell base station according to an embodiment of the present disclosure.

FIG. 8 is a view illustrating a state transition diagram used in managing a CRE state by the load balance determining unit of the macro cell base station according to an embodiment of the present disclosure.

According to an embodiment of the present disclosure, the CRE state may include a CRE deactivated state and a CRE activated state.

The Referring to FIG. 8, when is the CRE is in the deactivated state, the CRE_status is 0. In contrast, when the CRE is in the activated state, the CRE_status is 1.

Initially, when the eICIC is in an on state and the CRE is in an on state, the macro cell may start in the CRE deactivated state.

In the CRE deactivated state, to transit to the CRE activated state, the following conditions should be simultaneously satisfied.
  1. eICIC ON and CRE ON
  2. CRE_status=0
  3. The load of the macro cell should be equal to or larger than a specific value.
  4. A rate of the load occupied by an offloadable UE among loads of the macro cell should be equal to or larger than a specific value.

In the above conditions, the offloadable UE refers to a UE triggered to the macro CRE UE by a pico cell having a current load that is lower than a specific value.

In some embodiments, the last condition may be replaced as the following.
  A rate of the offloadable UE among all macro cells should be equal to or larger than a specific value.

Meanwhile, in a case of a transition from the CRE deactivated state to the CRE activated state, the following operations are performed.
  1. CRE_status=1
  2. eICICCIO(pico)=MROCIO(pico), all eICIC partner pico cells are performed.
  3. FeICICCIO(pico)=MROCIO(pico), all eICIC partner pico cells are performed.
  4. An ABS rate is configured as a minimum value larger than 0.

Meanwhile, in order to enter the CRE deactivated state from the CRE activated state, at least one condition should be satisfied among the following conditions.
  1. eICIC OFF
  2. CRE OFF
  3. (CRE_status=1), the load of the macro cell should be equal to or lower than a specific value, and a sum of the load occupied by the pico CRE UE of the pico cell, which is the eICIC partner, should be equal to or lower than a specific value.

In some embodiments, the last condition may be replaced as the following.
  (CRE_status=1), the load of the macro cell should be equal to or lower than a specific value, and a value obtained by dividing a sum of the load occupied by the pico CRE UE of the pico cell which is the eICIC partner by the load of the macro cell should be equal to or lower than a specific value.

Alternatively, the last condition may be replaced as the following.
  (CRE_status=1), the load of the macro cell should be equal to or lower than a specific value, and a value obtained by dividing a sum of the load occupied by the pico CRE UE of the pico cell, which is the eICIC partner, by the load of the macro cell and the pico cell should be equal to or lower than a specific value.

In addition, in order to be transited from the CRE activated state to the CRE deactivated state, the following operations are performed.
  1. CRE_status=0
  2. eICICCIO(pico)=MROCIO(pico), all eICIC partner pico cells are performed.
  3. FeICICCIO(pico)=MROCIO(pico), all eICIC partner pico cells are performed.

Figure 9:
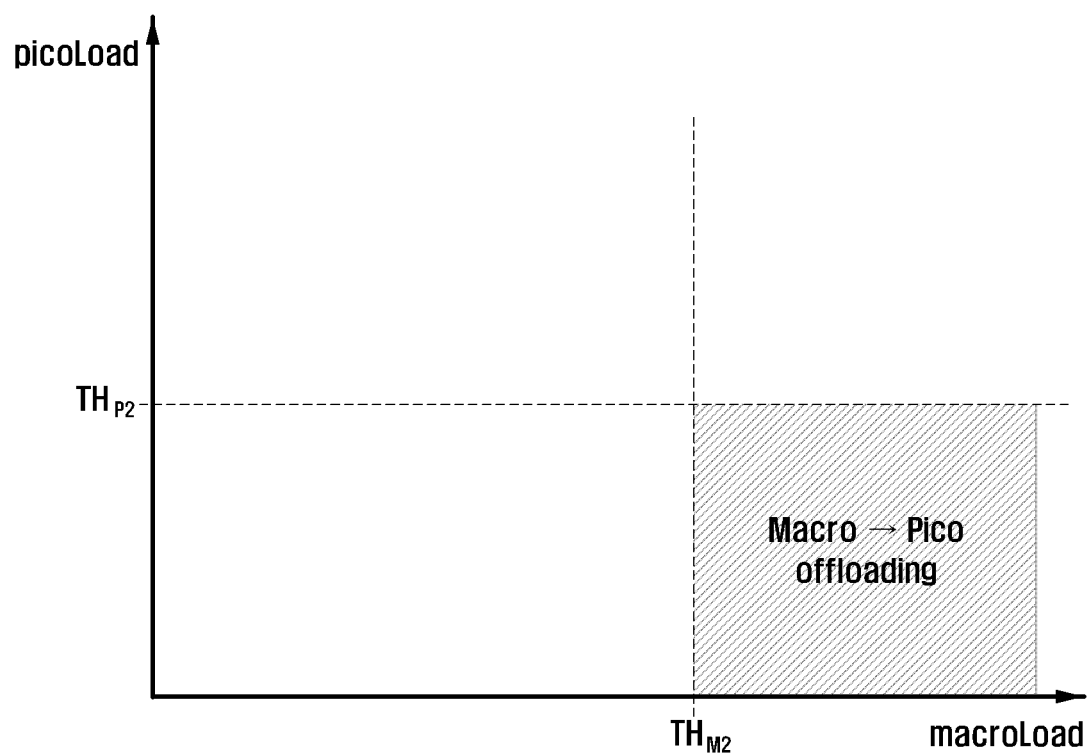
FIG. 9 is a view illustrating a reference for determining whether a load balance is performed on an eICIC partner pico cell by a load balance determining unit of the macro cell base station according to an embodiment of the present disclosure.

FIG. 9 is a view illustrating a reference for determining whether a load balance is performed to the eICIC partner pico cell by the load balance determining unit of the macro cell base station according to an embodiment of the present disclosure.

The operation may be performed in a specific period or non-periodically (e.g., when a specific event occurs), and may be performed only when a MLB is in an on state or when the eICIC is in an on state and the CRE is in an on state.

Referring to FIG. 9, when the load of the macro cell is equal to or larger than a specific value $TH_{M2}$, and the load of a specific pico cell is equal to or lower than a specific value $TH_{P2}$, the macro cell determines that a load balance to a corresponding pico cell is necessary.

Figure 10:
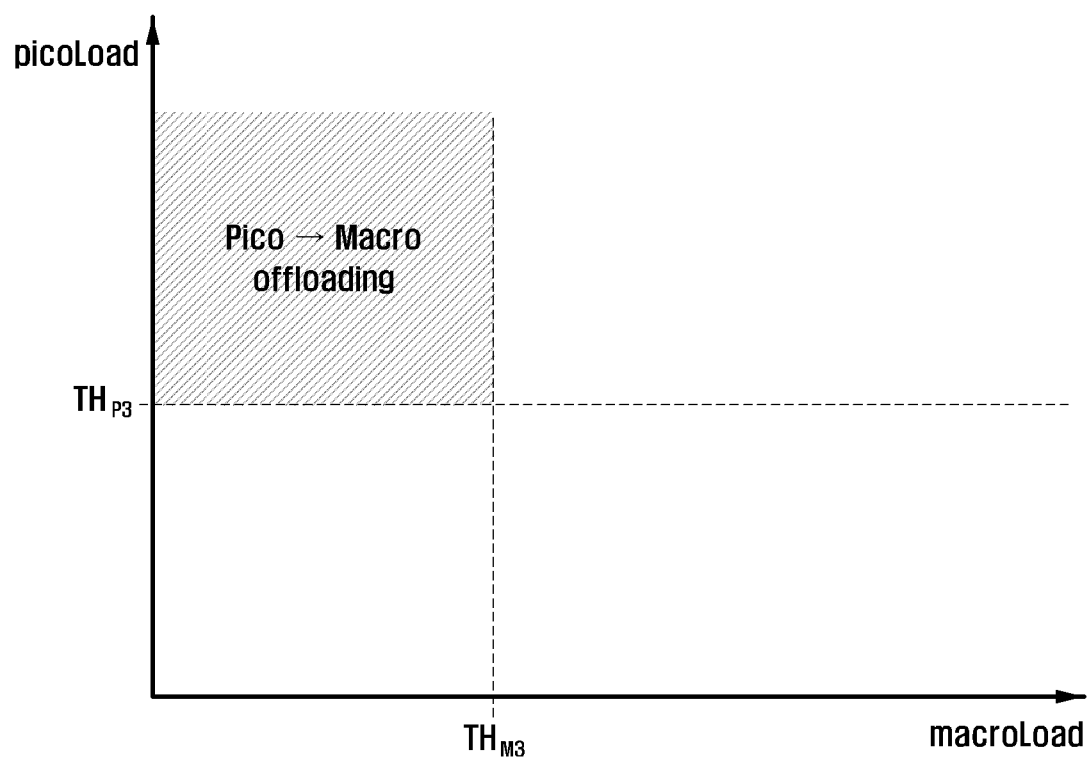
FIG. 10 is a view illustrating a reference for determining whether a load balance on a macro cell is performed by a load balance determining unit of a pico cell base station according to an embodiment of the present disclosure.

FIG. 10 is a view illustrating a reference for determining whether a load balance on the macro cell is performed by the load balance determining unit of the pico cell base station according to an embodiment of the present disclosure.

The operation may be performed in a specific period or non-periodically (e.g., when a specific event occurs), and may be performed only when a MLB is in an on state or when the eICIC is in an on state and the CRE is in an on state.

Referring to FIG. 10, when the load of the pico cell is equal to or larger than a specific value $TH_{P3}$, and the load of the macro cell is equal to or lower than a specific value $TH_{M3}$, the pico cell determines that a load balance to a corresponding macro cell is necessary.

Figure 11:
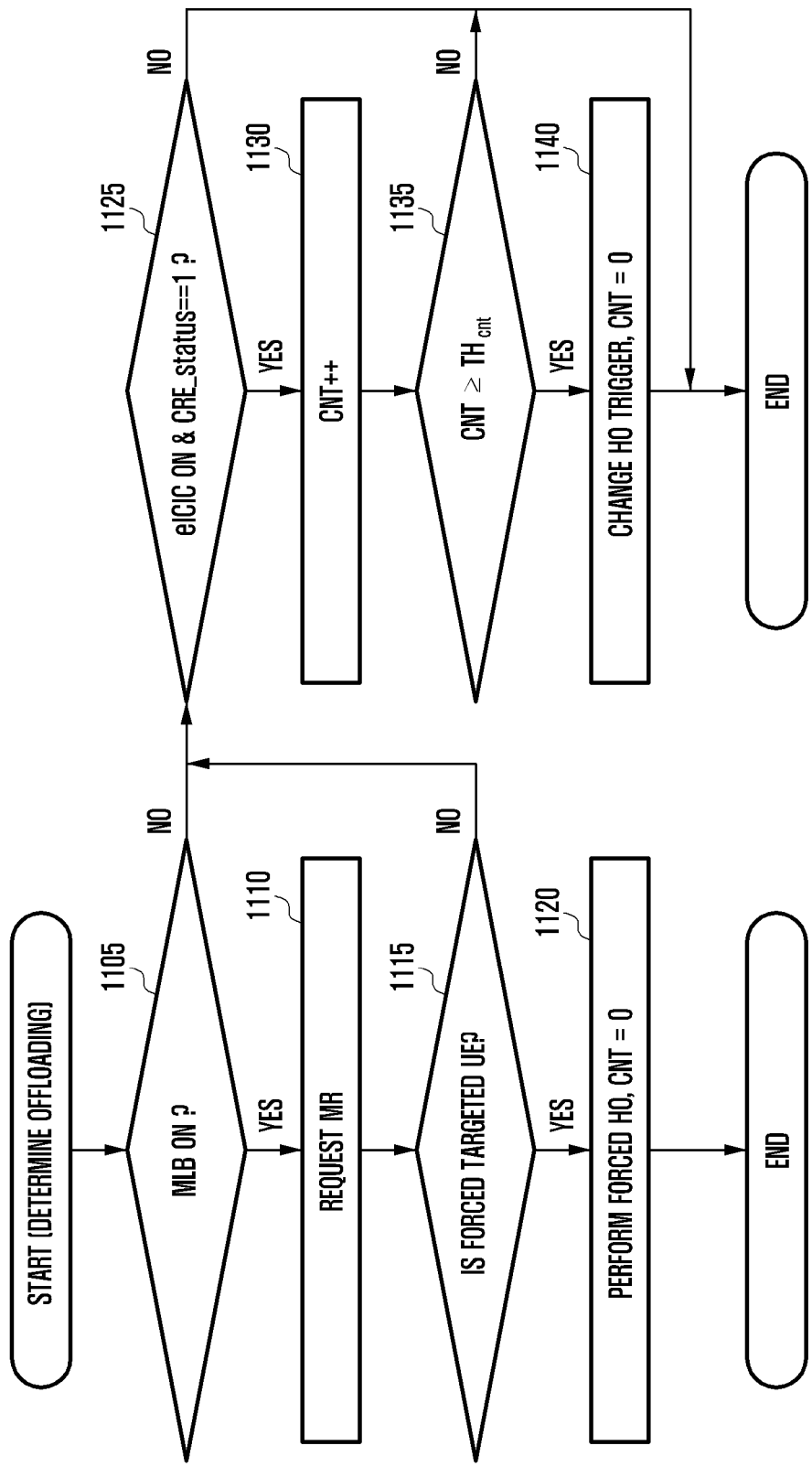
FIG. 11 is a flowchart illustrating an operation of the load balance by the macro cell base station and the pico cell base station according to an embodiment of the present disclosure.

FIG. 11 is a flowchart illustrating an operation of the load balance by the macro cell base station and the pico cell base station according to an embodiment of the present disclosure. Specifically, FIG. 11 may be a sequence of the operations performed by the load balance performing units of the macro cell base station and the pico cell base station.

Referring to FIG. 11, a sequence of the operations performed by the load balance performing units of the macro cell base station and the pico cell base station is described. Hereinafter, the load balance performing unit of the macro cell base station and the pico cell base station performs the operation of FIG. 11, but the present disclosure is not limited thereto.

As described above with reference to FIG. 9, the load balance determining unit of the macro cell base station may determine that the load balance to the eICIC partner pico cell is necessary. As described above, when the load of the macro cell is equal to or larger than the specific value $TH_{M2}$, and the load of the specific pico cell is equal to or lower than the specific value $TH_{P2}$, the load balance determining unit of the macro cell base station may determine that the load balance to a corresponding pico cell is necessary.

The load balance performing unit may distribute the load of the macro cell to the pico cell according to a load balance performing procedure shown in FIG. 11.

To this end, in operation 1105, the load balance performing unit determines whether the MLB function is activated (or on). When the MLB function is activated, in operation 1110, the load balance performing unit may request a MR to make at least one UE of the macro cell to report RSRP information for neighbor cells including a serving cell only when the UE satisfies a specific condition.

A method of selecting the UE to which the MR report is requested by the macro cell base station and the condition for report the MR are described below with reference to FIG. 12.

In operation 1115, the load balance performing unit waits for the report of the MR during a specific time and determines if a UE satisfies the condition for the MR request. If a UE satisfies the condition for the MR request in operation 1115, the load balance performing unit performs a forced HO for all UEs or some UEs reporting the MR in operation 1120. The forced handover may refer to a process for a handover of UEs of which the current serving cell is the macro cell base station to the pico cell base station which is the eICIC partner. Next, the load balance performing unit initializes count information (i.e., CNT) to 0, and ends the process.

When the MLB is not in an on state in operation 1105, there is no UE satisfying the condition for the MR request or MR is not performed during the specific time in operation 1115, the load balance performing unit performs operation 1125.

In operation 1125, the load balance performing unit determines whether the eICIC function is in an on state and the CRE is in an activated state. When the eICIC function is in an on state and the CRE is in an activated state, in operation 1130, the load balance performing unit increases the CNT value by 1.

Next, in operation 1135, the load balance performing unit determines whether the CNT value is equal to or larger than a predetermined reference value. When the CNT value is larger than the predetermined reference value, the load balance performing unit shifts a handover trigger toward the macro cell. This may indicate that a handover is performed on even UEs adjacent to the macro cell toward the pico cell, by shifting a reserve area toward the macro cell, in selecting UEs for performing the forced handover. A method of shifting the handover trigger toward the macro cell by one operation is specifically described below in FIG. 14.

Simultaneously, the load balance performing unit may initialize the CNT value as 0.

Meanwhile, when the eICIC is not in an on state in operation 1125, the CRE is in a deactivated state in operation 1125, or the CNT value is lower than the specific value in operation 1135, the process is ended.

Meanwhile, the process of FIG. 11 may be applied to a case in which the load balance determining unit of the pico cell base station determines that the load balance to the eICIC partner macro cell is necessary according to the condition of FIG. 10, by the same principle.

Referring back to operation 1105, the load balance performing unit of the pico cell base station determines whether the MLB function is activated (or on). When the MLB function is activated, in operation 1110, the load balance performing unit may request a Measurement Report (MR) to make at least one UE of the pico cell to report RSRP information for neighbor cells including a serving cell only when the UE satisfies a specific condition.

A method of selecting the UE to which the MR report is requested by the pico cell base station and the condition for report the MR are described below with reference to FIG. 13.

In operation 1115, the load balance performing unit waits for the report of the MR during a specific time. In operation 1120, the load balance performing unit 550 performs a forced HO for all UEs or some UEs reporting the MR. The forced handover may refer to a process for a handover of UEs of which the current serving cell is the pico cell base station to the macro cell base station which is the eICIC partner. Next, the load balance performing unit initializes count information (i.e., CNT) to 0, and ends the present process. Next, the load balance performing unit initializes count information (i.e., CNT) to 0, and ends the present process.

When the MLB is not in an on state in operation 1105, there is no UE satisfying the condition for the MR request in operation 1110, or any MR is not performed during the specific time in operation 1115, the load balance performing unit 550 performs operation 1125.

In operation 1125, the load balance performing unit determines whether the eICIC function is in an on state and the CRE is activated state. When the eICIC function is in an on state and the CRE is activated state, in operation 1130, the load balance performing unit increases the CNT value by 1.

Next, in operation 1135, the load balance performing unit determines whether the CNT value is equal to or larger than a predetermined reference value. When the CNT value is larger than the predetermined reference value, the load balance performing unit shifts a handover trigger toward the pico cell. This may mean that a handover is performed on even UEs adjacent to the pico cell toward the macro cell, by shifting a reserve area toward the pico cell, in selecting UEs for performing the forced handover. A method of shifting the handover trigger toward the macro cell by one operation is described below with reference to FIG. 15.

Simultaneously, the load balance performing unit may initialize the CNT value as 0.

Meanwhile, when the eICIC is not in an on state, the CRE is deactivated state, or the CNT value is lower than the specific value, the present process is ended.

Figure 12:
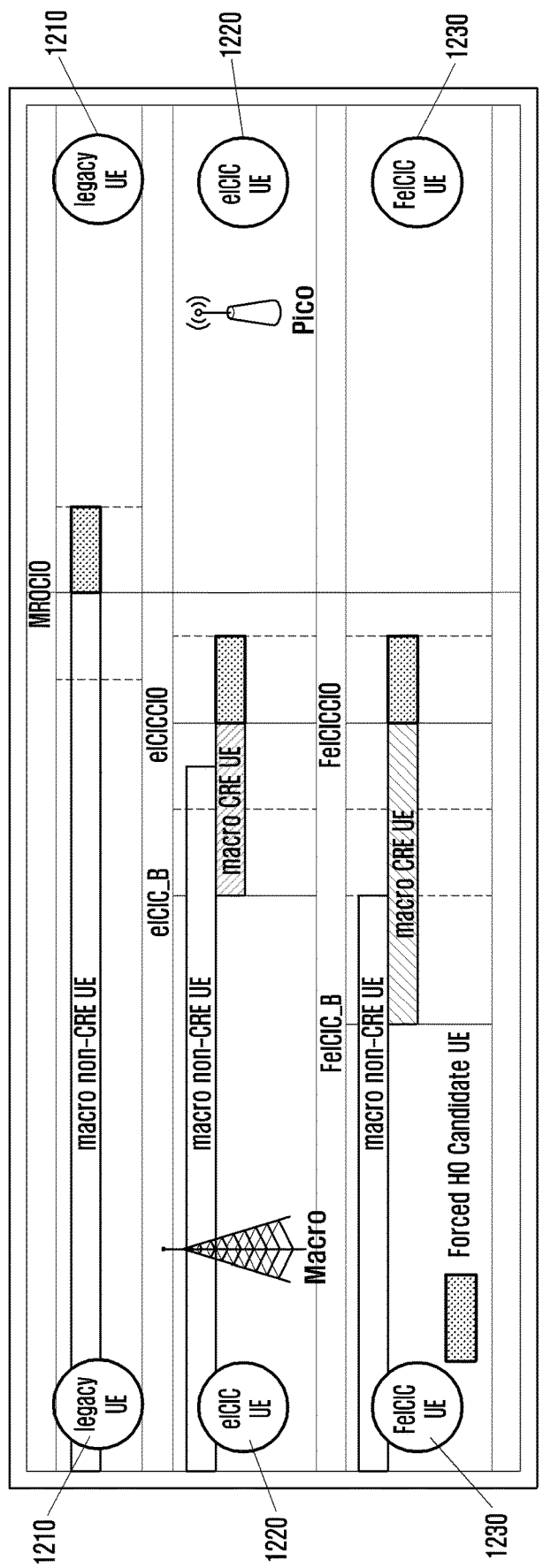
FIG. 12 is a flowchart illustrating a method of selecting a forced handover (HO) targeted UE by the macro cell base station according to an embodiment of the present disclosure.

FIG. 12 is a flowchart illustrating a method of selecting a forced HO targeted UE by the macro cell base station according to an embodiment of the present disclosure.

According to an embodiment of the present disclosure, a process shown in FIG. 12 may be performed by the load balance performing unit of the macro cell.

Referring to FIG. 12, for example, when any of the UEs of the macro cell is shifted toward the eICIC partner pico cell for a predetermined distance, a UE placed in an area where a handover to the pico cell is performed may be determined as the forced HO targeted UE.

In a case in which the eICIC is in an on state and the CRE is in an on state is described first.

When the eICIC is in an on state and the CRE is in an on state, the area where the forced HO targeted UE is placed may be determined as the area shown in FIG. 12.

For example, since all legacy UEs 1210 are the macro non-CRE UEs, the load balance performing unit may configure the A3 event for all legacy UEs or some UEs sampled from all UEs. In this case, the load balance performing unit may maintain the CIO value as MROCIO, and may configure the A3 offset as 0 dB.

In addition, in the case of the eICIC UE 1220, since the UE of the area shown in FIG. 12 is a subset of the macro CRE UE, the load balance performing unit may configure the A3 event for all macro CRE UEs or some UEs sampled from all macro CRE UEs, to only the eICIC UE which is the macro CRE UE. In this case, the load balance performing unit may maintain the existing eICICCIO and may configure the A3 offset as 0 dB.

In addition, in the case of the FeICIC UE 1230, since the UE of the area shown in FIG. 12 is a subset of the macro CRE UE, the load balance performing unit may configure the A3 event for the FeICIC UEs or some UEs sampled from the FeICIC UEs, to only the FeICIC UE which is the macro CRE UE. In this case, the load balance performing unit may maintain the existing FeICICCIO and may configure the A3 offset as 0 dB.

When the eICIC is in an off state or the CRE is in the off state, the A3 event may be configured to all UEs or some UEs sampled from all UEs, regardless of the legacy UE 1210, the eICIC UE 1220 and the FeICIC UE 1230.

As shown in FIG. 12, after the macro cell base station configures the A3 event, the macro cell base station may wait for the MR during a predetermined period. When the number of the MRs from the UEs is larger than a configured number, some UEs should be selected to be performed the force HO.

To this end, the macro cell base station excludes a UE of which an RSRP of another cell except for the serving macro cell is larger than an RSRP of the pico cell of which the load is to be balanced, from the forced HO targeted UE first. Next, the macro cell base station may previously select a UE of which (PicoRSRP−macroRSRP) value is the largest among the remaining UEs as the forced HO targeted UE. When there are UEs of which RSRO value differences are the same, the forced HO targeted UE may be selected in a sequence of the FeICIC UE, the eICIC UE and the legacy UE.

Figure 13:
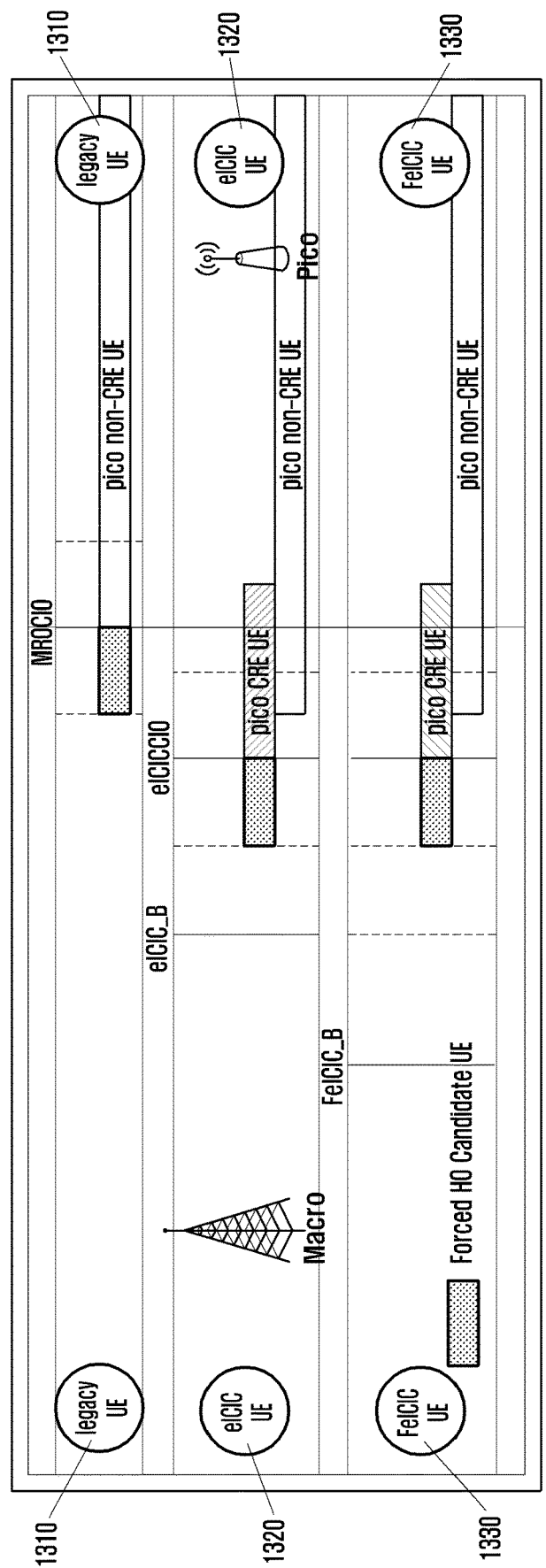
FIG. 13 is a flowchart illustrating a method of selecting a forced HO targeted UE by the pico cell base station according to an embodiment of the present disclosure.

FIG. 13 is a flowchart illustrating a method of selecting a forced HO targeted UE by the pico cell base station according to an embodiment of the present disclosure.

According to an embodiment of the present disclosure, a process shown in FIG. 13 may be performed by the load balance performing unit of the pico cell.

Referring to FIG. 13, for example, when any of the UEs of the pico cell is shifted toward the eICIC partner macro cell for a predetermined distance, a UE placed in an area where a handover to the macro cell is performed may be determined as the forced HO targeted UE.

In a case in which the eICIC is in an on state and the CRE is in an on state is described first.

When the eICIC is in an on state, the CRE is in an on state, and the coverage of the pico cell is expanded enough to satisfy a "(eICICCIO≥MROCIO+Δ)" condition, the load balance performing unit may determine the area where the forced HO targeted UE is placed as the area shown in FIG. 13.

For example, since all legacy UEs 1310 are the pico non-CRE UEs, the load balance performing unit may configure the A3 event for all legacy UEs or some UEs sampled from all UEs. In this case, the load balance performing unit 550 may maintain the CIO value as −MROCIO, and may configure the A3 offset as 0 dB.

In the case of the eICIC UE 1320, since the UE of the area shown in FIG. 13 is a subset of the pico CRE UE, the load balance performing unit may configure the A3 event for all pico CRE UEs or some UEs sampled from all pico CRE UEs, to only the eICIC UE which is the pico CRE UE. In this case, the load balance performing unit may maintain the CIO value as −eICICCIO and may configure the A3 offset as 0 dB.

In the case of the FeICIC UE 1330, since the UE of the area shown in FIG. 13 is a subset of the pico CRE UE, the load balance performing unit may configure the A3 event for the FeICIC UEs or some UEs sampled from the FeICIC UEs, to only the FeICIC UE which is the pico CRE UE. In this case, the load balance performing unit may maintain the CIO value as −FeICICCIO and may configure the A3 offset as 0 dB.

When the eICIC is in an off state or the CRE is in the off state, the A3 event may be configured to all UEs or some UEs sampled from all UEs, regardless of the legacy UE, the eICIC UE and the FeICIC UE.

At this time, in the case of the legacy UE, the load balance performing unit may maintain the CIO value as −MROCIO, and may configure the A3 offset as 0 dB.

In addition, in the case of the eICIC, the load balance performing unit may maintain the CIO value as −eICICCIO, and may configure the A3 offset as 0 dB.

In addition, in the case of the FeICIC, the load balance performing unit may maintain the CIO value as −FeICICCIO, and may configure the A3 offset as 0 dB.

After the pico cell base station configures the A3 event as described above, the pico cell base station may wait for the MR during a predetermined period. When the number of the MRs from the UEs is larger than a configured number, some UEs should be selected to be perform the forced HO.

To this end, the pico cell base station previously selects a UE having the largest quality, which is based on the "(macro RSRP−pico RSRP)" calculation, among the UEs reporting the MR. The pico cell base station may sequentially select the legacy UE, the eICIC UE and the FeICIC UE based on the RSRP values.

Figure 14:
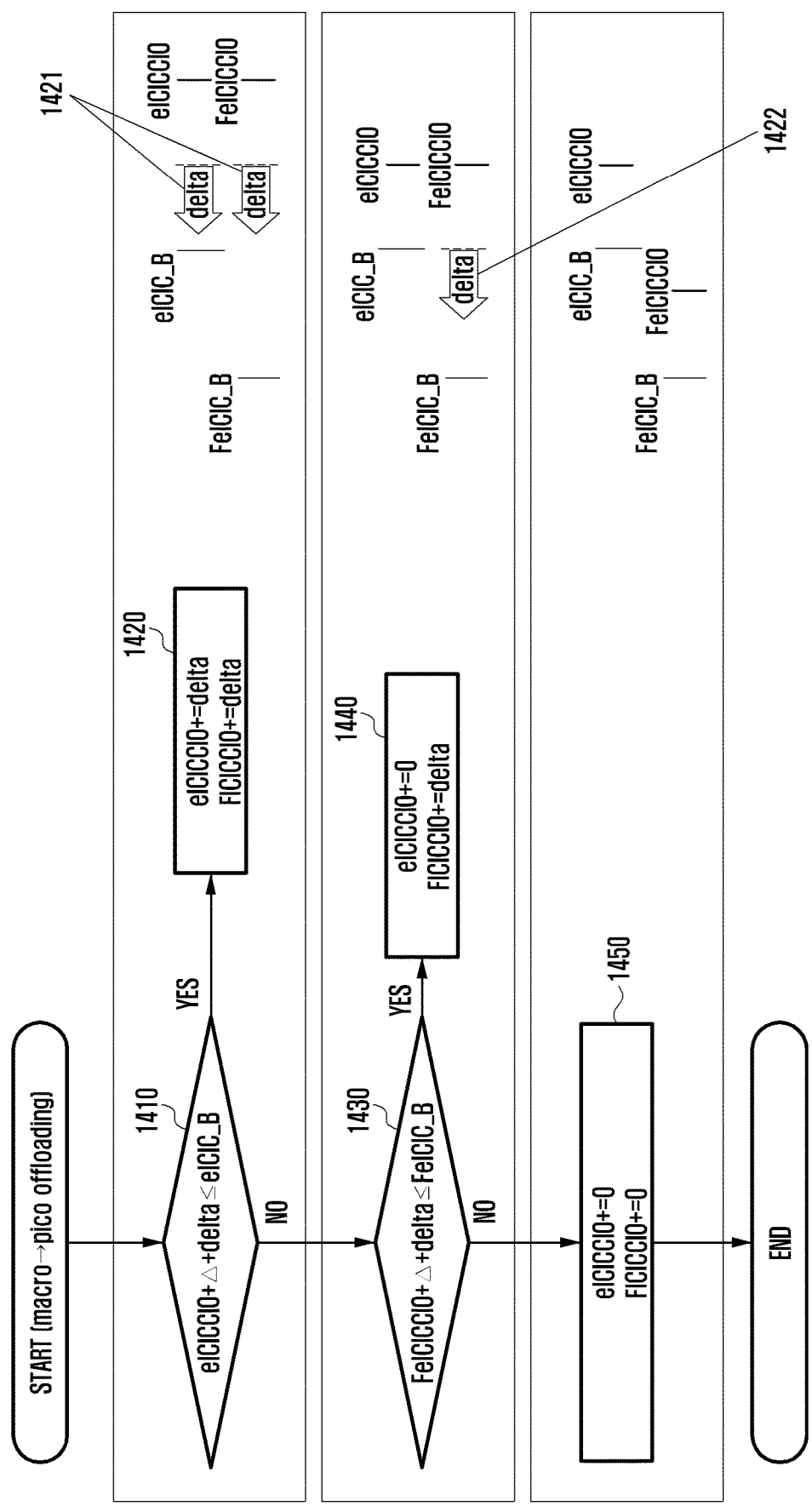
FIG. 14 is a flowchart illustrating a method of expanding a coverage of the pico cell by shifting a HO trigger for the eICIC partner pico cell toward the macro cell in the macro cell base station according to an embodiment of the present disclosure.

FIG. 14 is a flowchart illustrating a method of expanding the coverage of the pico cell by shifting the handover trigger for the eICIC partner pico cell toward the macro cell in the macro cell base station according to an embodiment of the present disclosure.

The handover trigger according to an embodiment of the present disclosure may refer to a reference line through which a HO from the macro cell base station to the pico cell base station or from the pico cell base station to the macro cell base station is performed.

The process shown in FIG. 14 may be performed by the load balance performing unit of the macro cell base station.

Referring to FIG. 14, an increased value (or delta) shown in FIG. 14 may occur due to a base unit controlling the CIO. The delta may be a designated value by 3GPP LTE standard, or may be a variable value by an operator.

In operation 1410, the load balance performing unit determines whether the pico cell is not expanded enough to satisfy "(eICICCIO+Δ+delta≤eICIC_B)". The eICICCIO may refer to a CIO value configured to the eICIC UE. The eICIC_B may refer to a limit line through which the eICIC UE may be handed over to the pico cell.

When the condition "(eICICCIO+Δ+delta≤eICIC_B)" is satisfied, in operation 1420, the load balance performing unit adds the delta to each of the eICICCIO and the FeICICCIO. The FeICICCIO may be a CIO value configured to the FeICIC UE. Referring to a reference numeral 1421, each of the eICICCIO and the FeICICCIO shifts by the same delta value.

If the condition in operation 1410 is not satisfied, the load balance performing unit determines whether the condition "(FeICICCIO+Δ+delta≤FeICIC_B)" is satisfied in operation 1430. The dissatisfaction of the condition "(eICICCIO+Δ+delta≤eICIC_B)" and the satisfaction of the condition "(FeICICCIO+Δ+delta≤FeICIC_B)" may mean that the eICICCIO should not become larger, but the FeICICCIO may become larger. That is, since the FeICIC UE has a function of removing the CRS from the macro cell, although the FeICIC UE is more adjacent to the macro cell as compared to the eICIC UE (i.e., although the handover trigger is adjacent to the macro cell), the handover to the pico cell is possible. Thus, in operation 1440, the load balance performing unit maintains the eICICCIO value and adds the delta to only the FeICICCIO. The delta of operation 1420 and the delta of operation 1440 may be the same or may be different. Referring to a reference numeral 1422, the eICICCIO does not shift and only the FeICICCIO shifts toward the macro cell base station by the delta.

Meanwhile, when all of the conditions of operation 1410 and operation 1430 are not satisfied, it is impossible to expand the pico cell coverage any more.

In this case, in operation 1450, the load balance performing unit may not change the eICICCIO and the FeICICCIO.

Figure 15:
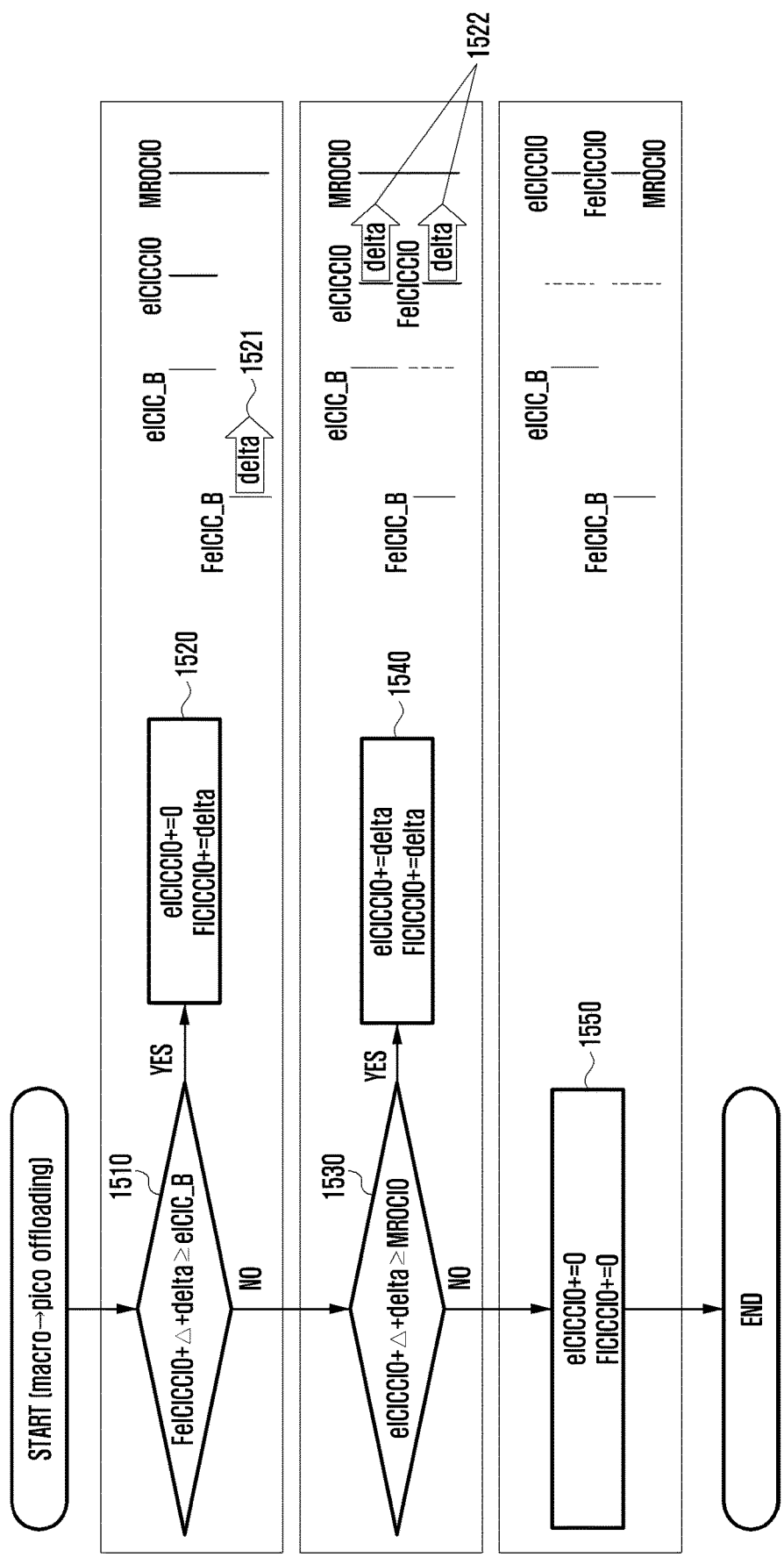
FIG. 15 is a flowchart illustrating a method of reducing the coverage of the pico cell by shifting the HO trigger for the eICIC partner pico cell toward the pico cell in the pico cell base station according to an embodiment of the present disclosure.

FIG. 15 is a flowchart illustrating a method of reducing the coverage of the pico cell by shifting the handover trigger for the eICIC partner pico cell toward the pico cell in the pico cell base station according to an embodiment of the present disclosure.

The process shown in FIG. 15 may be performed by the load balance performing unit of the pico cell base station.

Figure 16:
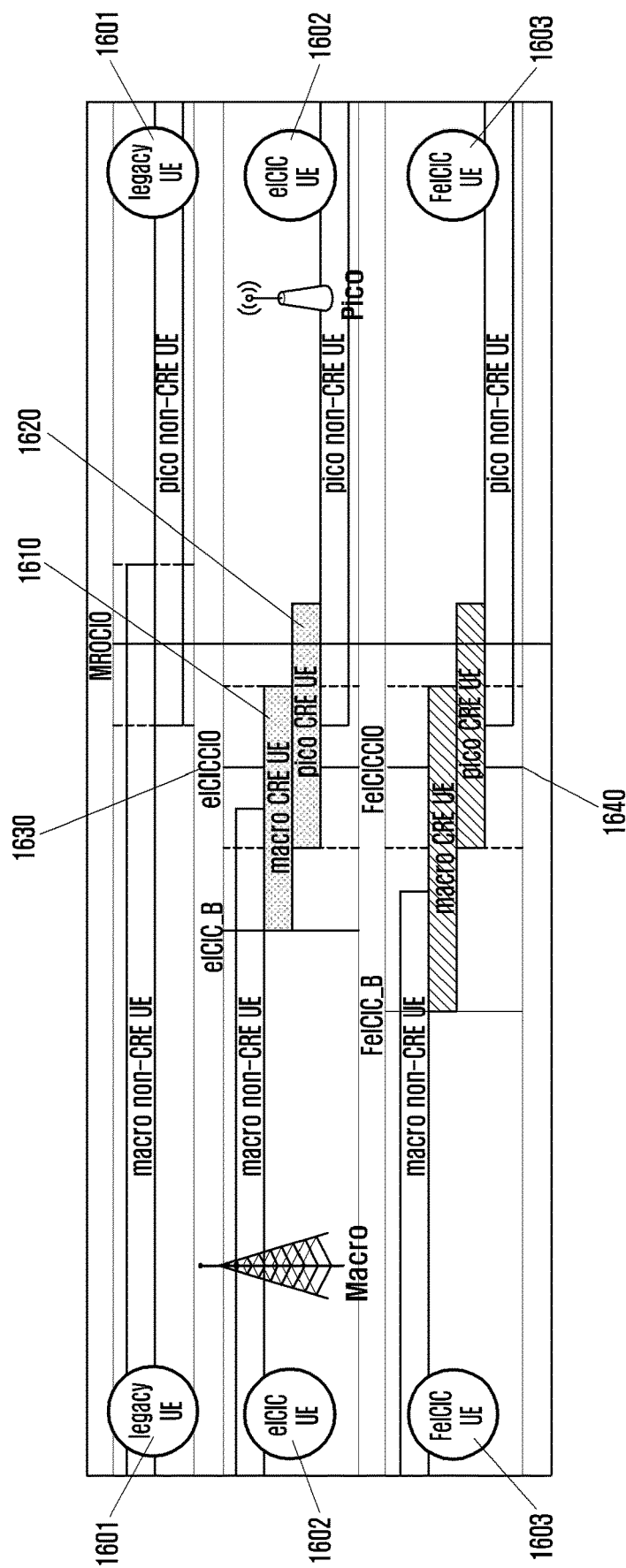
FIG. 16 is a view illustrating an area where each type of UE may be placed according to each group according to an embodiment of the present disclosure.

Referring to FIG. 16, an increase value (or delta) shown in FIG. 15 may occur due to a base unit controlling the CIO. The delta may be a designated value by 3GPP LTE standard, or may be a variable value by an operator.

In operation 1510, the load balance performing unit may determine whether the pico cell is sufficiently expanded enough to satisfy "(FeICICCIO+Δ−delta≥eICIC_B)".

When the condition "(FeICICCIO+Δ−delta≥eICIC_B)" is satisfied, in operation 1520, the load balance performing unit maintains the eICICCIO and subtracts the delta from the FeICICCIO. Referring to a reference numeral 1521, only a value of the FeICICCIO shifts toward the pico cell base station by the delta.

In contrast, if the condition "(FeICICCIO+Δ−delta≥eICIC_B)" is not satisfied, in operation 1530, the load balance performing unit determines whether the condition "(eICIC-CIO−delta≥MROCIO)" is satisfied. The dissatisfaction of the condition "(FeICICCIO+Δ−delta≥eICIC_B)" and the satisfaction of the condition "(eICICCIO−delta≥MROCIO)" may mean that the eICICCIO and the FeICICCIO are the same and the coverage of the pico cell base station may be more reduced. Thus, in operation 1540, the load balance performing unit 550 subtracts the delta from each of the eICICCIO and the FeICICCIO. Referring to a reference numeral 1522, each of the eICICCIO and the FeICICCIO shifts by the delta toward the pico cell base station.

In addition, when all of the conditions of operation 1510 and operation 1530 are not satisfied, it is impossible to reduce the coverage of the pico cell base station any more. Thus, in operation 1550, the load balance performing unit 550 may not change the eICICCIO and the FeICICCIO.

FIG. 16 is a view illustrating an area where the each type of UE may be placed according to each group according to an embodiment of the present disclosure.

Referring to FIG. 16, four types of groups including the macro non-CRE UE, the macro CRE UE, the pico non-CRE UE and the pico CRE UE are illustrated. The definitions of each group are described with reference to FIG. 2, and thus detailed descriptions will be omitted.

Overlapping portions of a macro CRE UE coverage area 1610 a pico CRE UE coverage area corresponds to the reserve area (i.e., the CRE area).

Referring to FIG. 16, the eICIC UE 1602 has a variable reserve area according to a movement of the eICICCIO 1630 referring to a reference line of the reserve area.

In addition, the FeICIC UE 1603 has a variable reserve area according to a movement of the FeICICCIO 1640 referring to a reference line of the reserve area.

Referring to FIG. 16, a movement range of the FeICICCIO 1640 for the FeICIC UE 1603 is wider than that of the eICICCIO 1630 for the eICIC UE 1602. That is, since the FeICIC UE 1603 has a function of removing the CRS transmitted from the macro cell base station, the FeICIC UE 1603 may have a wider reserve area compared to the eICIC UE 1602.

Figure 17:
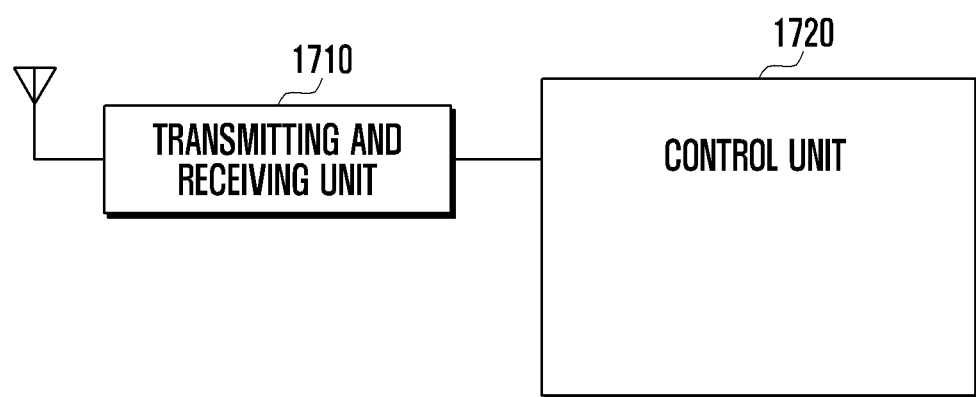
FIG. 17 is a block diagram of a UE according to an embodiment of the present disclosure.

FIG. 17 is a block diagram a UE according to an embodiment of the present disclosure.

Referring to FIG. 17, the UE of the present disclosure may include a transmitting and receiving unit 1710 and a control unit 1720.

The transmitting and receiving unit 1710 may transmit and receive signals to and from a base station by forming a wireless channel.

The control unit 1720 controls a signal flow between blocks to allow the UE to operate according to an embodiment of the present disclosure.

The control unit 1720 may receive a measurement report configuration message from a macro base station or a small base station. In this case, the measurement report configuration message may be configured by a first base station such that the first base station may detect an entrance or exit from a reserve area of the UE. Next, the control unit 1720 may transmit a measurement result to the macro base station or the small base station after measuring according to the configuration of the measurement report configuration message.

Accordingly, the first base station may determine whether the UE enters or exits the reserve area, according to the measurement report configuration message received from the UE.

According to the above-mentioned embodiment of the present disclosure, a method of an inter-cell load balance and a method of an inter-cell interference adjustment in a heterogeneous network mobile communication system in which a macro base station and a small base station are mixed are provided, and thus a wireless resource efficiency of a network can be increased. In addition, according to the present disclosure, a load balance state of a network can be adaptively reflected by providing a method of an inter-cell load balance and a method of an inter-cell interference adjustment.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method by a first base station in a heterogeneous network wireless communication system including the first base station and a second base station, the method comprising:

transmitting, to a plurality of user equipments (UEs) served by the first base station, a first configuration message, including first information on a first offset value to trigger a transmission of a first measurement report;

receiving, from a UE among the plurality of UEs, the first measurement report based on the first configuration message;

performing an interference cancellation operation for the UE, after the first measurement report is received;

transmitting, to the UE which transmits the first measurement report, a second configuration message including second information on a second offset value to trigger a transmission of a second measurement report;
receiving, from the UE, the second measurement report based on the second configuration message; and
stopping the interference cancellation operation for the UE, after the second measurement report is received,
wherein an area for the interference cancellation operation is determined based on the first offset value and the second offset value, and
wherein a reserve area for load balance is determined based on the first offset value, the second offset value, and a type of a terminal, the type being associated with an interference cancellation function.

2. The method of claim 1,
wherein the first measurement report is received in case that the UE moves out of a first boundary line associated with the first offset value,
wherein the second measurement report is received in case that the UE moves in a second boundary line associated with the second offset value, and
wherein the type of the UE includes one of a first type that does not support an enhanced inter-cell interference coordination (eICIC) function and a further eICIC (FeICIC) function, a second type that supports the eICIC function, and a third type that supports the FeICIC function.

3. The method of claim 2, further comprising:
determining whether a forced handover of at least one UE of the plurality of UEs is necessary; and
performing the forced handover on the at least one UE to a second base station, when the forced handover is necessary,
wherein the at least one UE is located out of the first boundary line, and
wherein the determining comprises determining whether a load balance is necessary, based on at least one of an activation of an inter-cell interference control function, an existence of an inter-cell interference control partner cell, or an almost blank subframe (ABS) rate which is currently being applied.

4. The method of claim 3, further comprising:
transmitting, to the at least one UE, a third configuration message for triggering a transmission of a third measurement report;
selecting the at least one UE for the forced handover; and
receiving the third measurement report from the at least one UE, based on the third configuration message.

5. The method of claim 4, wherein the selecting comprises selecting the at least one UE when the second base station has a load that is equal to or lower than a predetermined threshold value.

6. The method of claim 4, further comprising:
determining whether a reserve area of the first base station is in a movable state, when the forced handover is not necessary or the third measurement report is not received from the at least one UE; and
changing, when the reserve area of the first base station is in the movable state, a handover reference line between the first base station and the second base station to shift the reserve area of the first base station toward the first base station or the second base station.

7. The method of claim 6, wherein the determining of whether the reserve area of the first base station is in the movable state comprises determining that the reserve area of the first base station is in the movable state, when the eICIC function and a cell expansion area (CRE) function is in an activated state.

8. The method of claim 7,
wherein the changing of the handover reference line comprises changing a third offset value of an A3 event for one of the first type, the second type and the third type, and
wherein a movement range of the handover reference line for a UE of the third type is wider than a movement range of the handover reference line for a UE of the second type.

9. A first base station in a heterogeneous network wireless communication system, the first base station comprising:
a transceiver; and
at least one processor configured to:
control the transceiver to transmit, to a plurality of user equipments (UEs) served by the first base station, a first configuration message including first information on a first offset value to trigger a transmission of a first measurement report,
control the transceiver to receive, from a UE among the plurality of UEs, the first measurement report based on the first configuration message,
perform an interference cancellation operation for the UE, after the first measurement report is received,
control the transceiver to transmit, to the UE which transmits the first measurement report, a second configuration message including second information on a second offset value to trigger a transmission of a second measurement report,
control the transceiver to receive, from the UE, the second measurement report based on the second configuration message, and
stop the interference cancellation operation for the UE, after the second measurement report is received,
wherein an area for the interference cancellation operation is determined based on the first offset value and the second offset value, and
wherein a reserve area for load balance is determined based on the first offset value, the second offset value, and a type of a terminal, the type being associated with an interference cancellation function.

10. The first base station of claim 9,
wherein the first measurement report is transmitted from the UE, in case that the UE moves out of a first boundary line associated with the first offset value,
wherein the second measurement report is transmitted from the UE, in case that the UE moves in a second boundary line associated with the second offset value, and
wherein the type of the UE includes one of a first type that does not support an enhanced inter-cell interference coordination (eICIC) function and a further eICIC (FeICIC) function, a second type that supports the eICIC function, and a third type that supports the FeICIC function.

11. The first base station of claim 10, wherein the at least one processor is further configured to:
determine whether a forced handover of at least one UE of the plurality of UEs is necessary, and
perform the forced handover on the at least one UE to a second base station when the forced handover is necessary,
wherein the at least one UE is located out of the first boundary line, and wherein the at least one processor is further configured to determine whether the forced handover is necessary, based on at least one of an activation of an inter-cell interference control function, an existence-or-not of an inter-cell interference control partner cell, or an almost blank subframe (ABS) rate which is currently being applied.

12. The first base station of claim 11, wherein the at least one processor is further configured to:
control the transceiver to:
transmit, to the at least one UE, a third configuration message for triggering a transmission of a third measurement report,
select the at least one UE of the plurality of UEs for the forced handover, and
receive the third measurement report from the at least one UE, based on the third configuration message.

13. The first base station of claim 12, wherein at least one processor is further configured to select the at least one UE when the second base station has a load that is equal to or lower than a predetermined threshold value.

14. The first base station of claim 12, wherein the at least one processor is further configured to determine whether a reserve area of the first base station is in a movable state when the forced handover is not necessary or the third measurement report is not received from the at least one UE, and when the reserve area of the first base station is in the movable state, the at least one processor controls to change a handover reference line between the first base station and the second base station to shift the reserve area of the first base station toward the first base station or the second base station.

15. The first base station of claim 14, wherein the at least one processor is further configured determine that the reserve area of the first base station is in the movable state, when the eICIC function and a cell expansion area (CRE) function is in an activated state.

16. The first base station of claim 14,
wherein the at least one processor is further configured to change the handover reference line by changing a third offset value of an A3 event associated with the third configuration message for one of the first type, the second type and the third type, and
wherein a movement range of the handover reference line for a UE of the third type is wider than a movement range of the handover reference line for a UE of the second type.

17. A user equipment (UE) for performing a measurement report in a heterogeneous network wireless communication system including a first base station and a second base station, the UE comprising:
a transceiver; and
at least one processor configured to:
control the transceiver to receive, from the first base station, a first configuration message including first information on a first offset value to trigger a transmission of a first measurement report,
control the transceiver to transmit, to the first base station, the first measurement report based on the first configuration message,
control the transceiver to receive, from the first base station, a second configuration message including second information on a second offset value to trigger a transmission of a second measurement report, and control the transceiver to transmit, to the first base station, the second measurement report based on the second configuration message,
wherein an interference cancellation operation for the UE is performed by the first base station based on the first measurement report associated with the first offset value, and
stopped by the first base station based on the second measurement report associated with the second offset value,
wherein an area for the interference cancellation operation is determined based on the first offset value and the second offset value, and
wherein a reserve area for load balance is determined based on the first offset value, the second offset value, and a type of a terminal, the type being associated with an interference cancellation function.

18. The UE of claim 17,
wherein the first measurement report is transmitted from the UE, in case that the UE moves out of a first boundary line associated with the first offset value, and
wherein the second measurement report is transmitted from the UE, in case that the UE moves in a second boundary line associated with the second offset value.

19. A method of reporting a measurement of a user equipment (UE) in a heterogeneous network wireless communication system including a first base station and a second base station, the method comprising:
receiving, from the first base station, a first configuration message including first information on a first offset value to trigger a transmission of a first measurement report;
transmitting, to the first base station, the first measurement report based on the first configuration message;
receiving, from the first base station, a second configuration message including second information on a second offset value to trigger a transmission of a second measurement report; and
transmitting, to the first base station, the second measurement report based on the second configuration message,
wherein an interference cancellation operation for the UE is performed by the first base station based on the first measurement report associated with the first offset value, and
stopped by the first base station based on the second measurement report associated with the second offset value,
wherein an area for the interference cancellation operation is determined based on the first offset value and the second offset value, and
wherein a reserve area for load balance is determined based on the first offset value, the second offset value, and a type of a terminal, the type being associated with an interference cancellation function.

20. The method of claim 19,
wherein the first measurement report is transmitted from the UE, in case that the UE moves out of a first boundary line associated with the first offset value, and
wherein the second measurement report is transmitted from the UE, in case that the UE moves in a second boundary line associated with the second offset value.

* * * * *